（12) United States Patent
Marks

(10) Patent No.: US 6,501,093 B1
(45) Date of Patent: Dec. 31, 2002

(54) QUANTUM ENERGY STORAGE OR RETRIEVAL DEVICE

(76) Inventor: Alvin M. Marks, 359 R Main St., Athol, MA (US) 01331

(*) Notice: Subject to any disclaimer, the term of this patent is extended or adjusted under 35 U.S.C. 154(b) by 0 days.

(21) Appl. No.: 08/919,575

(22) Filed: Mar. 20, 1997

Related U.S. Application Data

(63) Continuation of application No. 08/222,448, filed on Apr. 4, 1994, now abandoned.

(51) Int. Cl.$^7$ .................................................. H01L 35/24
(52) U.S. Cl. .......................... 257/40; 257/431; 136/263
(58) Field of Search ........................ 257/40, 431, 448; 136/263

(56) References Cited

U.S. PATENT DOCUMENTS 4,574,161 A * 3/1986 Marks ......................... 136/263

* cited by examiner

Primary Examiner—Sara Crane

(74) Attorney, Agent, or Firm—Nixon Peabody LLP; David S. Safran

(57) ABSTRACT

A solid state Quantum high Energy density Storage Or Retrieval device known as a quensor, and the trademark ENSOR™, having an energy density of about 1–15 kwhr/kg, comparable to gasoline, or more, is described. A fundamentally new principle is employed: A quensor film comprises oriented molecules with donor and acceptor groups and with metal layers on its surfaces. A dipole electric field may be established in the gap between a donor and an acceptor. Electric energy is stored in or retrieved from dipole electric fields throughout the volume of the quensor film. Electric energy is stored in the quensor film by charging the dipole electric fields from an electric energy source. Electric energy is retrieved from a quensor film by discharging the dipole electric fields and supplying the energy to a load. Electric breakdown in the film is avoided because positive and negative electric charges in the film are balanced everywhere. Busbars attached to the metal layers are connected to terminals for charging or discharging the device. The manufacture of a quensor film is described. A composite photovoltaic and quensor panel for the storage or retrieval of solar-electric energy day or night on demand is also described.

17 Claims, 8 Drawing Sheets

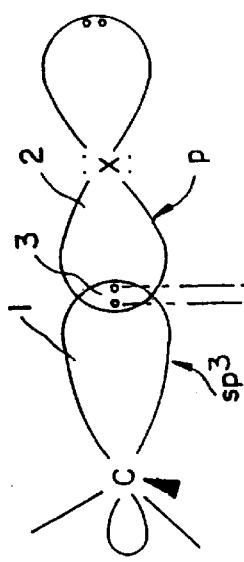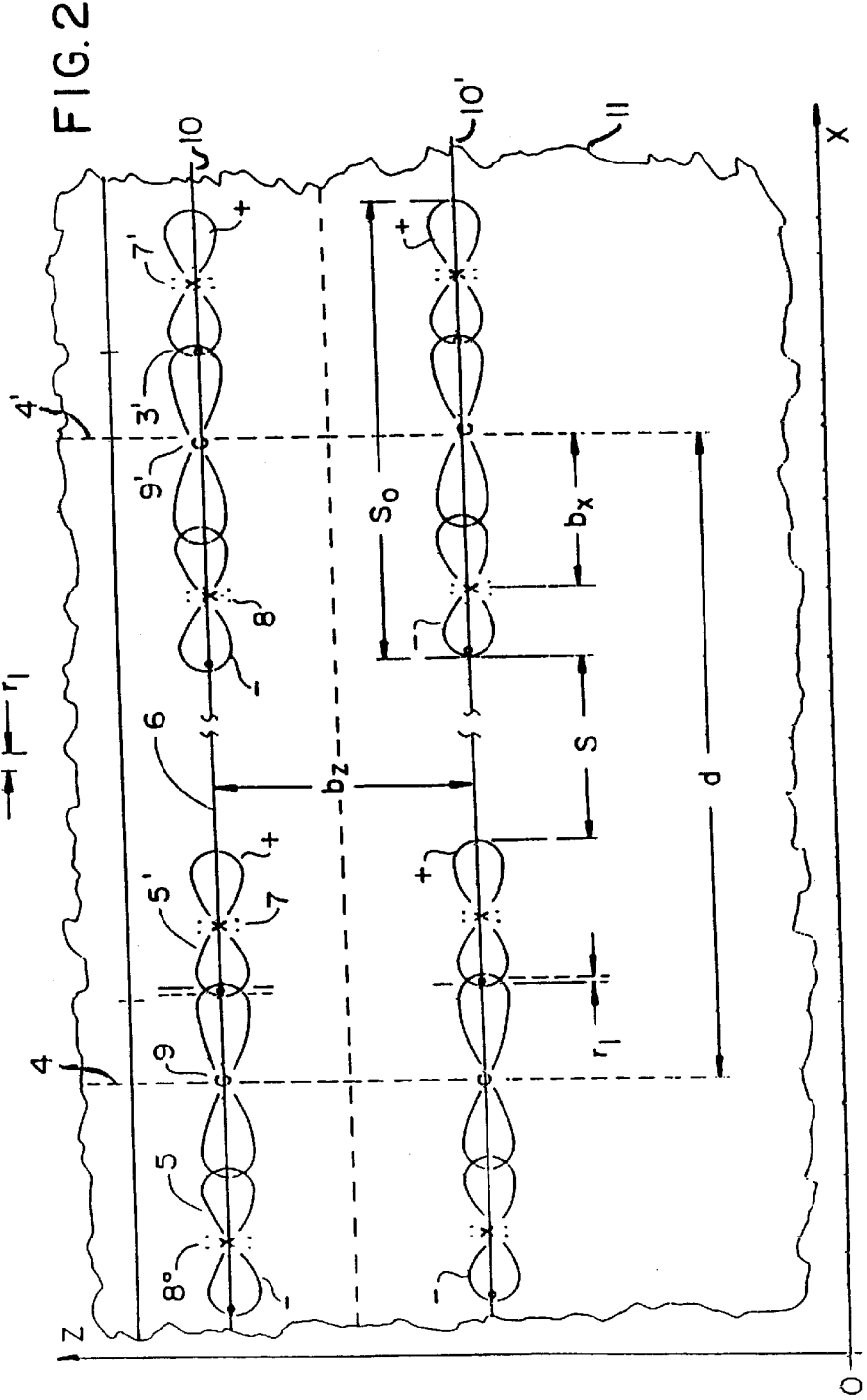

QUANTUM ENERGY STORAGE OR RETRIEVAL DEVICE

This is a continuation of application Ser. No. 08/222,448, filed on Apr. 4, 1994, which was abandoned upon the filing hereof 08/919,575.

FIELD OF THE INVENTION

This invention relates to a solid state Quantum high Energy density Storage Or Retrieval device known as a quensor, and the trademark ENSOR™, having an energy density of about 1–15 kwhr/kg, comparable to gasoline, or more to a theoretical limit of about 75 kwhr/kg, is described. A fundamentally new principle is employed: A quensor film comprises oriented molecules with donor and acceptor groups, and with metal layers on the film surfaces. A dipole electric field may be established in the gap between a donor and an acceptor. Electric energy is stored in or retrieved from dipole electric fields throughout the volume of the quensor film. Electric energy is stored in the quensor film by charging the dipole electric fields from an electric energy source. Electric energy is retrieved from a quensor film by discharging the dipole electric fields and supplying the energy to a load. Electric breakdown in the film is avoided because positive and negative electric charges in the film are balanced everywhere. Busbars attached to the first and second metal layers are connected to terminals for charging or discharging the device.

In one embodiment the composite film comprises a plurality of stretch-oriented polymer chains with pendant donor and acceptor groups, and a gap between the donor and acceptor. In another embodiment the composite film comprises molecules with donor acceptor groups, and a gap between an adjacent donor and an acceptor, the molecules being electroordered and fixed in position.

This invention also relates to the manufacture of a quensor film.

This invention further relates to a composite photovoltaic and quensor panel for the storage or retrieval of solar-electric energy day or night on demand.

03.

DEFINITIONS

Quensor: A quantum energy storage or retrieval device q-line: In a quensor, a line having a repeated pattern comprising an acceptor covalently linked to a donor and a gap between a donor and an adjacent acceptor.

Cell Configuration of a Unit Volume of Energy Storage or Retrieval.

Composite Film: A quensor polymer film between first and second outer metal layers on the film surfaces.

Covalent Bond: Elements such as Carbon tend to acquire their electron octets by sharing orbital electrons.[1.1] Example:

(1)

Electron Affinity: The energy gained by an electron from the electric field when it is acquired by an an atom or molecule. An element on the far right of the periodic table may acquire an electron to produce the stable electronic orbital configuration of the next higher noble gas. [2.41]

$$F + e^- \rightarrow F^-$$ (2)

9 electrons 10 electrons; same as neon

Group: An assembly of one or more atoms, usually attached to another atom or molecule by one or more covalent bonds.

Donor: A group characterized by the loss of electron, producing a positive ion.

Acceptor: A group characterized by an affinity for, and a gain of an electron. The electron is trapped by the acceptor, which becomes a negative ion.

Electric Dipole Field: Before the loss of an electron from a donor the internal positive and negative charges of the donor are balanced and close together. When an electron is removed from a donor group across a gap to an acceptor group, the donor becomes a positive ion, the acceptor becomes a negative ion, and electric energy is supplied from an external source to create an dipole electric field in the gap.

Spacer: A group forming an insulating bridge across the tunnel distance between a donor group and an acceptor group.

Gap: The tunnel distance between a donor and an acceptor, which may be-free space, or a spacer. In an electric field an electron may tunnel from a donor to an acceptor across a gap; or, in no field, less frequently, may spontaneously tunnel back.

Critical Range: A tunnel distance of 7 Å to 30 Å between donor and acceptor.

Linker: A group linking a donor and an acceptor.

Pillar: A rigid insulating structural group used as a crosslinking spacer between polymer chains.

Induced Dipole: An electric dipole in a group of atoms temporarily produced by a displaced electric charge without ionization of the group of atoms. An induced dipole, also known as the vector quantity "Polarization P" [5.1], exists only in the presence of an electric field.

Positive Electron Affinity: The Electric Energy Output to the electric circuit from an atom or group due to the addition of an electron to the atom or group. An Acceptor Group having a positive electron affinity attracts an electron.[2.4, 3.2]

Negative Electron Affinity: The Electric Energy Input from an electric circuit to a group to add an electron to the group. A Group with negative electron affinity repels an electron.[3.2]

Ionization Potential: The electric energy to remove an electron from an outer orbital of an atom or group of atoms.[1.3, 3.1]

Electric Energy Storage: In a quensor electric energy is stored in an dipole electric field. The dipole electric field exists in the gap between the electric charges on the positive and negative ions. The donor becomes a positively charged ion by the loss of an electron from its outer quantum orbital; and the acceptor becomes a negative ion by its outer quantum orbital acquiring an electron. The electric energy is supplied by an external electric energy source. The electric energy is stored while the dipole electric field exists.[3]

Electric Energy Retrieval: Conversely, in a quensor electric energy is retrieved from the dipole electric field by neutralizing the positive and negative charges on its ions. The electric dipole field ceases to exist when its electric energy is transferred to the load.

Electret: A dielectric material exhibiting quasi-permanent electric charge storage. [10]

Void: An empty volume of space, a vacuum containing no atoms, having a dielectric constant defined as 1.00.

ENSOR™: is trademark owned by the inventor, and an acronym for ENergy Storage Or Retrieval.

04.

RELATED PATENTS AND APPLICATIONS

U.S. Pat. No. 4,442,019 entitled "Electroordered Dipole Suspension" issued Apr. 10, 1984 to Alvin M. Marks, filed Jan. 5, 1981, Ser. No. 222377, and related U.S. Application data; U.S. Pat. No. 5,229,624 issued Jul. 20, 1993 to Alvin M. Marks entitled "Light-Polarizing Electrically-Conducting Film", filed Oct. 1, 1990, Ser. No. 591,051. The subject matter of said patents is included herein in whole or in part, by reference.

05.

BACKGROUND OF THE INVENTION

An efficient low cost energy storage or retrieval device is critically needed to eliminate pollution by substituting for gasoline in automotive vehicles, and for many other uses. Energy storage or retrieval devices known to the art other than nuclear and combustible fuel for heat engines are: conventional capacitors, electrochemical supercapacitors, electromagnetic energy storage rings including superconducting electromagnetic energy storage rings, and storage batteries. At this time, storage batteries are the preferred electric energy storage or retrieval devices. The state of the art on storage batteries was recently summarized. [6] In Table I the energy density storage capability and other pertinent characteristics of prior art and projected storage batteries are compared with the device of the present invention. The last column shows comparative values estimated for the ENDOR™ energy storage or retrieval device of this invention.

TABLE I

GOALS FOR ADVANCED BATTERIES AND ENSOR ™.

| Time Frame | 1992 | 1994 | 2000 | 1998 |
|---|---|---|---|---|
| Type of Battery | Lead Acid | Na—S—Ni Hydride | Li Polymer Li—Al—FeS$_2$ | ENSOR |
| kw hrs/kg | .025–.040 | .080–.100 | .200 | 15 |
| Range Miles | 40–100 | 150–200 | 300 | 600 |
| Recharge Time hrs | 6–8 | <6 | 3–6 | 3–6 |
| Life yrs | 3–5 | 5 | 10 | >15 |
| Cost $/kw hr/kg | $120–125 | <$40–150 | <$100 | <$25. |

The electric energy storage per unit weight of a conventional capacitor of the prior art is limited by the maximum sustainable electric field in the insulating layer at breakdown. In a conventional capacitor the electric breakdown field in the insulating layer is usually less than $2\times10^7$ V/m (500 V/mil).[7] The electric breakdown of the insulating layer is caused by local ionization of its atoms or molecules, which produce free electrons, secondary ionization, and an avalanche of free electrons which gain energy and punch a hole in the layer, causing a short circuit.

Recent work with "ultrathin" layer capacitors shows that electric field intensity may approach $8\times10^8$ volts/m. in an insulator thickness of 50–100 Å [7, 8]; an electric field intensity of about 40× the conventional electrical breakdown field. In these capacitors, electric breakdown due to an electron avalanche: (1) cannot start if the applied voltage is less than the ionization potential of the material, to about 10–15 volts, (2) cannot propagate if the layer thickness between conductors is too small to support secondary ionization, less than about 200 Å, (3) the thickness is sufficiently great to prevent electron tunnelling, exceeding about 40 Å. [20.1, 21]

The double-layer-capacitor (DLC) concept is old in the art.[9] It employs porous carbon electrodes and an electrolyte, and is not solid state. A DLC dipole layer may support large electric fields at a low voltage: 1 to 1.6 volts across a spacing of about 2 Å, or $2\times10^{-10}$ m; that is, $0.8\times10^{10}$ V/m. In a DLC the sustainable electric field is increased by a factor of 400 over that of a conventional capacitor. However the utility of a DLC has been limited by the small perating voltage and excessive current leakage through the layer, which causes rapid discharge.

An electric charge may be stored in an electret (1) by poling or rotating an electrically charged group of atoms in the direction of an electric field (2) usually near the surface of a thin sheet. The greatest reported storage of electric charge density is small: about $1\times10^{-2}$ C/m$^2$ [10.1]

The electric energy storage or retrieval device of this invention is in a distinctly new class:

1. A quensor is a solid state device, a thin polymer film having a molecular structure ordered by stretch-orientation and an electric field, a pendant donor group, a tunnelling gap, and a pendant acceptor group, and first and second metal layers on the surfaces of the film. Alternatively, in a quensor, the molecular structure may be electroordered.[24]

2. In a quensor, the donor group preferably has a high ionization potential. The donor group may be a carbon halide. [3,11,12] As a donor, fluorine has the greatest ionization potential, and as an acceptor fluorine has a high electron affinity. The donor is positively ionized by losing an electron, and the acceptor is negatively ionized by gaining an electron. In one embodiment, a fluorine atoms acts as a donor [2.3,3.1]; and, an adjacent fluorine atom acts as an acceptor.[2.4,3.2]

3. In a quensor, the gap between donor and acceptor is 5 Å to 30 Å.[21 An electron may tunnel across the gap to establish a dipole electric field. Energy from an electric energy source is required to create the dipole electric field. The net electric energy stored in the dipole electric field is calculated in Sec. 08.22. An external electric energy source charges the dipole electric fields of the quensor film. Electric energy supplied to a load discharges the dipole electric fields of the quensor film.

4. There is no buildup of high voltage in the film due to space charge, because the electric charges in each cell are always balanced. The system is analogous to a plurality of condensers in series in an electric circuit. Electric energy is simultaneously stored in, or retrieved from the electric fields between the adjacent plates of all the condensers; and similarly, in a quensor, from the electric fields between adjacent donors and acceptors.

5. Electric energy from an electric energy source supplied to a cell creates a positive ion and a negative ion, and establishes a dipole electric field in the gap between them. Electric energy from the cell supplied to the load discharges the dipole electric field. An electron may only move back and forth within a cell. Each cell has atomic scale dimensions, hence electric energy may be stored in high density throughout the volume of a film.

The energy density is calculated to be about 15 kWhr/kg, or more.[Sec. 08.22 and FIG. 4.]

6. To store electric energy in a quensor film, a voltage from an electric power source is applied to thes metal layers on its surfaces. The electric energy is stored in dipole electric fields throughout the volume of the quensor film.

7. In retrieving electric energy, the metal layers of the quensor film are connected to a load, the dipole electric fields throughout the volume of the quensor film are discharged, and the stored electric energy from these fields is delivered to the load.

8. The device of this invention is solid state. There is no chemical reaction. Energy is stored or released by the motion of electrons in the cells throughout the quensor film. Comparing the electric energy storage of the present invention with the prior art conventional capacitor, the sustainable electric field is about $10^{10}$ v/m an increase by a factor of about 500. Because of the atomic scale of each cell, electron motion is confined to small distances where the laws of quantum mechanics prevail; and in which no electron avalanche and no electric breakdown occurs. This enables an enormous increase in the electric energy storage or retrieval per unit weight; of the order of about 1–15 kWhr/kg, or more; and solves the problems of the prior art.

0.6.

OBJECTS OF THE INVENTION

It is an object of this invention to provide an electric storage or retrieval device having about the same electric energy storage as the useful mechanical energy provided by an equal weight of gasoline; that is, about 15 kWhr/kg.; or 54,000 kJ/kg.[Sect 08.21]

It is a further object of this invention to provide an electric energy storage device made of noncombustible and nontoxic materials.

It is a further object of this invention to provide an electric storage device with a small leakage factor, to enable the stored electric energy to remain available over long periods of time.

An object of this invention is to eliminate air pollution due to the combustion of oil or gasoline from the exhaust of gases from the automobile, which add carbon dioxide and toxic pollutants to the atmosphere, contributing to the Greenhouse Effect and to respiratory disease due to Smog.

An important object of this invention is to provide a low-cost solid state electric energy source as a substitute for gasoline, having about the same energy/weight ratio, to enable an electric drive to replace the gasoline engine.

It is a further object of this invention to provide an electric storage device which is simple to manufacture and low enough in cost to compete successfully with gasoline, making the use of an electric car feasible for long distance travel.

It is a still further object of this invention to universally provide a solid state high energy/weight ratio electric energy storage or retrieval device for cars, planes, spacecraft, computers, TV and for a myriad of other uses.

It is an important object of this invention to provide a solid state device for the storage of electric energy from a solar electric energy source, or for connection to an electric circuit for electric energy utilization on demand.

07.

BRIEF DESCRIPTION OF THE FIGURES

FIG. 1 is a diagram of a carbon dihalide group, its covalent bonds and electron orbitals, on a scale of 30,000,000/1.

FIG. 2 is a diagram of a pair of carbon dihalide groups on adjacent polymer chains for the storage or retrieval of electric energy according to this invention, on a scale of 15,000,000/1.

Figure 4:
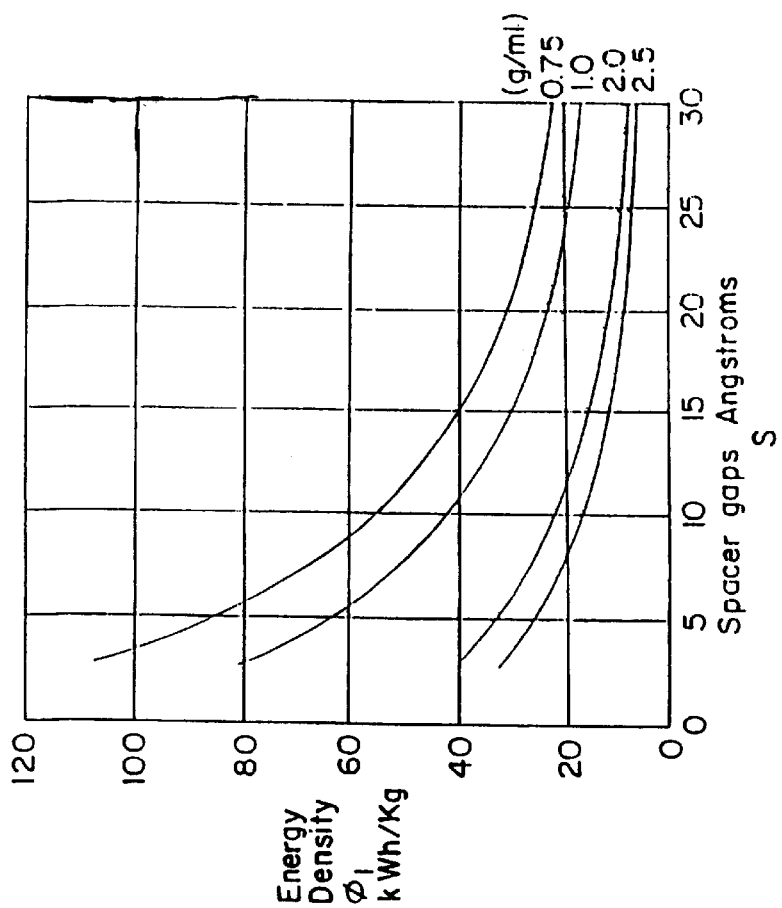
FIG. 4 are log-linear graphs of energy per unit weight in kwhr per kg stored in the dipole electric fields of a cell, versus donor acceptor gap distance in Å, for various densities in gms/ml.

08.

DESCRIPTION OF THE INVENTION 08.1

The Quensor Film 08.11

Chemistry

FIG. 1 is a diagram of the orbitals of a carbon halide group comprising a carbon atom 1 and a halide atom 2, in which electrons are shared to form a covalent bond 3.

The molecular structures of polyethylene and polytetrafluoroethylene and related polymers, which are utilized in embodiments of this invention have been described [10, 11, 13, 14, 17]. Polyethylene PE is a zigzag chain with a distance between $CH_2$ groups of 2.55 Å.

The polytetrafluoroethylene PTFE chain is a helix; at less than 19° C. there are 13 turns of the helix with a repeat distance of 16.9 Å; between 19° C. and 30° C., there are 15 turns of the helix with a 19.5 Å repeat distance; however, above 30° C. chain librations increase and no specific helix is defined. Table II describes a few structures and summarizes this data:.

TABLE II

MOLECULAR STRUCTURE OF POLYETHYLENE PE
and
HELICAL MOLECULAR STRUCTURE OF
POLYTETRAFLUOROETHYLENE PTFE
versus
TEMPERATURE

| Material | Temperature Range ° C. | Turns/Repeat Distance Å | Repeat Distance Å | Bond Distance Å | Bond |
|---|---|---|---|---|---|
| PE | stable planar zigzag | — | | 2.55 | C-C |
| PTFE | helix <19 | 13 | 16.9 | | C-C |
| PTFE | helix 19–30 | 15 | 19.5 | | |
| PTFE | — >30 | undefined | undefined | | |

FIG. 2 is a diagram showing the basic energy storage entity of this invention. It comprises a plurality of pendant carbon halide groups 5, 5', . . . on stretch-oriented polymer chains 4, 4', . . . The polymer chains, which are shown as dashed lines, are stretch oriented along the OZ axis, and may comprise polyethylene difluoride: —$(CF_2)_n$—. A voltage V, applied across the pendant groups 5, 5' cause their alignment parallel to the OX axis, ionization, creation of a dipole electric fields, and storage of electric energy in each dipole electric field.

Figure 3:
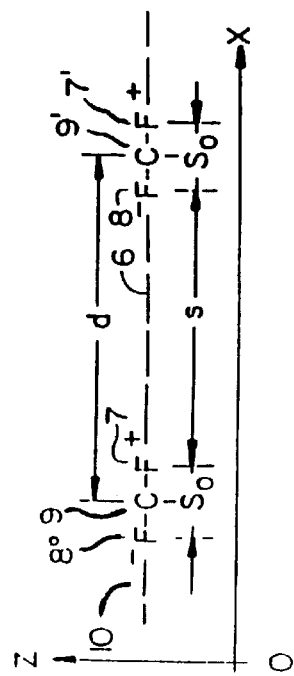
FIG. 3 is a diagram of a single cell in a q-line.

Many donor and acceptor atoms and/or groups of atoms may be utilized for charge storage or retrieval. The term Ionization Potential is used to characterize Donors. An electron may be removed from a Donor atom or group resulting in a positive ion. The term Electron Affinity is characterized by the addition of an electron to an atom or group resulting in a negative ion. Referring to FIG. 3, in a q-line 10, a dipole electric field is established in the gap 6 between a positive ion on a donor 7, and a negative ion on an acceptor 8 in each cell between link 9 and link 9'. Electric energy is stored in the dipole electric fields internally between the preceding acceptor negative ion 8° and the positrive donor ion 7, and in the gap 6 between the donor ion 7 and the acceptor ion 8. The positive and negative electric charges are balanced in each cell; hence there is no space charge buildup, and no electric breakdown. The electric energy stored in the dipole electric fields of each cell is additive. The voltage increases linearly along the OX axis with film thickness.

Many of the Acceptor Groups listed in Table III are also listed as Donor Groups in Table IV. The terms Acceptor and Donor are not precise and depend on the magnitude of the applied electric field. A donor may also have an electron affinity, and thus be a donor or acceptor. This property may be employed in a quensor according to this invention; in particular, as a donor, fluorine has an ionization potential of 17.4 eV; or, 10.4 eV for a $CF_2$ group; as an acceptor, fluorine has an electron affinity of +3.5. eV. Fluorine may be ionized to form a positive ion or a negative ion; electric energy is stored in a dipole electric fields between positive and negative ions.

TABLE III

ACCEPTORS AND ELECTRON AFFINITY

| To add an electron to an atom or molecule | ENERGY eV [1.2, 2.4, 3.2] |
|---|---|
| $NO_2^-$ | 3.91 |
| $F^-$ | 3.448 |
| $CN^-$ | 3.17 |
| $I^-$ | 3.063 |
| $H_2$ | −0.72 |
| $C_2H_2$ | −1.81 |

TABLE IV

IONIZATION POTENTIAL

| To remove electron from a Donor Group | ENERGY required eV [1.3, 2.3, 3.1] |
|---|---|
| $Cs^+$ | 3.894 |
| $K^+$ | 4.341 |
| $Na^+$ | 5.212 |
| $Ru^+$ | 5.279 |
| $Cu^+$ | 7.726 |
| $Re^+$ | 7.88 |
| $—NMe_2^+$ | 7.9 |
| $—NHMe^+$ | 8.2 |
| $Zn^+$ | 9.394 |
| $Me^+$ | 10.0 |
| $NH_3^+$ | 10.2 |
| $CF_2^+$ | 10.4 |
| $I^+$ | 10.451 |
| $—OH^+$ | 10.8 |
| $CN^+$ | 14.3 |
| $F^+$ | 17.442 |

FIG. 4 are log-linear graphs of energy per unit weight in kwhr per kg electric, versus donor acceptor gap distance in Å, for various densities in gms/ml. The energy per unit weight of a cell having a gap distance of about 10 Å is about 20 kwhrs/kg for a density of 2 gms/ml. compared to gasolene 15 kwhrs/kg. (see sections 08.21 and 08.22)

Figure 5:
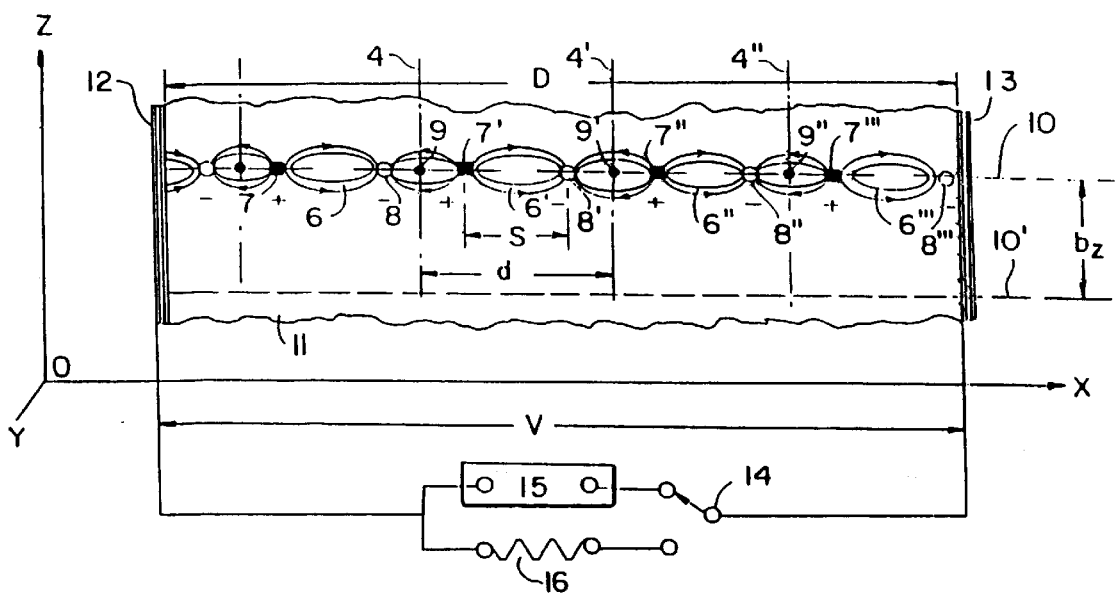
FIG. 5 is a diagram of a plurality of cells in a q-line.

FIG. 5 is a diagram of a plurality of cells in a q-line, in an electric energy storage or retrieval device according to this invention.

1. Charging: The voltage V is applied to the first and second metal layers 12 and 13 on the surfaces of the quensor film 11 via switch 14 from an electric energy source 15.

Referring to FIG. 3 the applied voltage V causes the ionization of the donor 7 and the acceptor 8. The donor 7 is positively ionized by losing an electron, and the acceptor 8 is negatively ionized by gaining an electron. The ionization of donor and acceptor is caused by the tunnelling of an electron from a donor to an acceptor. An electron may tunnel:

§1.1 across the gap between the donor 7 and acceptor 8, or

§1.2 internally across link 9 between donor 7 and acceptor 8°.

Figure 6:
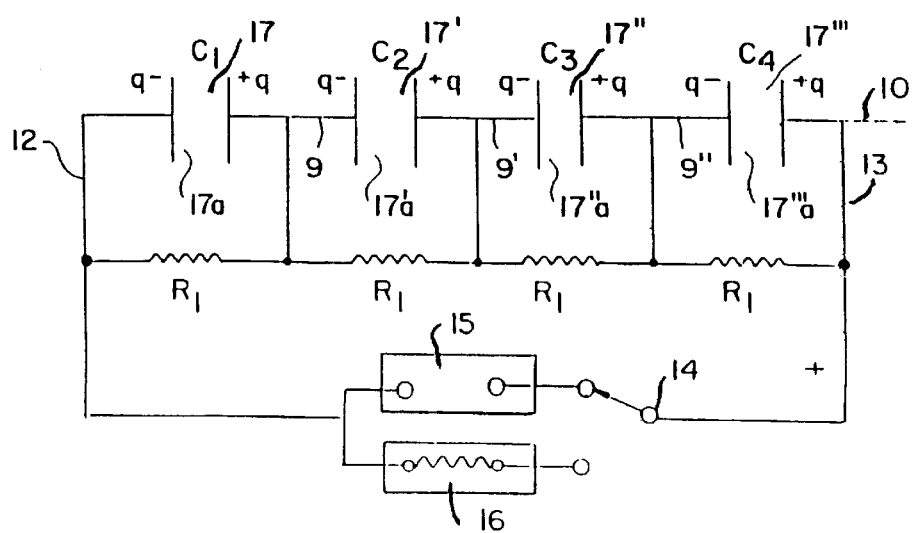
FIG. 6 is an equivalent electric circuit diagram of a q-line.

The charging and discharging of the quensor circuits shown in FIG. 3 and FIG. 5 is superficially similar to the charging and discharging of the series condensers equivalent electric circuit shown in FIG. 6. FIG. 6 is the equivalent electric circuit of the q-line shown and discussed to aid in understanding the q-line of FIG. 5. The equivalent electric circuit is a plurality of condensers 17, 17', 17" . . . , 17n, respectively: C1, C2, C3, C4, . . . , Cn of equal capacitance connected in series along the line 10. The condensers are charged by electric power source 15 at voltage V; or discharged through the load 16. During charging a voltage $V_1$=V/n is applied across each condenser 17, 17' . . . Electric charges +q and −q appear on opposite plates of each condenser. Electric energy $E_1$ is stored in an electric field in each condenser.[Sec. 08.22]

Condensers 17, 17',17", . . . , respectively have condenser plates 17a, 17b; 17'a, 17'b; etc. connected by wire links 17c, 17c' . . . In charging the series condensers, the electric charge −q, comprising N electrons, moves from condenser plate 17b to 17a' via wire link 17c. The condenser plate 17b acquires a positive charge +q; and, the condenser plate 17a, a negative charge −q. This occurs simultaneously in all the condensers in series. The electric field energy resides in all the spaces between the +q and −q charges on adjacent condenser plates; analogous to the electric energy residing in the dipole electric fields between a donor positive ion and an adjacent acceptor negative ion, described with reference to FIG. 5.

When a q-line is charged, a single electron is taken from the positive terminal of the q-line, which is connected to the positive terminal of the electric power source 15. An electron is supplied to the other end of the q-line at the negative terminal of the electric power source. An electron simultaneously tunnels from donor to acceptor across each of the n gaps along the q-line. The electric energy is stored in the n dipole electric fields established internally and in each gap along the q-line. The voltage across the entire line is: V=n $V_1$. The total energy stored in a q-line is eV joules.

2. Discharging: In FIG. 6, when the series of charged condensers is connected to a load, the +q charge on condenser $C_n$ flows through the load 16 and discharges the −q charge on condenser $C_1$. Instantly, the +q and −q charges on all the condenser plates simultaneously flow together along each of the conducting links 9, 9', 9" . . . , and neutralize each other. The electric fields between all of the capacitors 17, 17', 17" . . . 17n disappear, and their stored electric energy is simultaneously delivered to the load 16.

If condensers in series are charged, and disconnected from the electric power source or sink, they will remain charged except for a small discharge rate due to resistive leakage across the terminals. The charges +q and −q on adjacent condenser plates, comprise a large number of electrons in a macrocircuit; the condensers therefore may be slowly or quickly charged or discharged. In contradistinction, in the q-lines 10, 10', . . . shown in FIGS. 3 and 5, the electric charge is a single electron, +e and −e across each gap 6, 6', . . . The circuit elements have atomic dimensions with quantum properties, such as ionization of atomic orbitals and electron tunnelling. Electric energy is stored in the dipole electric fields established internally between acceptor ion 8° and the donor ion 7, and in the gap s between donor ion 7 the acceptor ion 8. Ideally, a quensor may be considered as a plurality of parallel q-lines 10, 10', 10", . . . Actually, the q-lines may be zig-zag or a series parallel random network. The q-lines are either fully charged or fully discharged. The "all or nothing" charging of a q-line is due to the quantum nature of charge storage or retrieval. When a q-line is discharged it becomes an insulator. The properties of a q-line are fundamentally different from its equivalent electric circuit. The resemblance is superficial, but instructive.

The net electric charge of each cell in a q-line, throughout the volume of a quensor film, is zero. The electric field across each dipole is established by the movement of a single electron within each cell. Consequently there is no voltage buildup due to space charge. The electric voltage buildup across the quensor film layer 11 is solely due to the sum of the voltages of the electric fields of each dipole in series along a line parallel to the OX axis. When a q-line is discharged a single electron is given to its positive terminal connected to the load 16 and thence via the load to its negative terminal. The positive donor and negative acceptor charges flow through the carbon atom links between them and neutralize each other. All the dipole fields along the q-lines cease to exist, simultaneously delivering their electric energy to the load.

The quensor is a constant voltage electric power storage sink; or, a constant voltage electric power source. A plurality of parallel q-lines coexist. As electric power is drawn, completely charged q-lines discharge, and the q-line becomes an insulator. The voltage across the quensor q-lines active or insulating, remains constant. During the storage of electric power at voltage V more charged q-lines are created. During retrieval of electric power from a quensor the number of charged q-lines decreases, but the voltage across the entire quensor remains constant. Because the number of charged q-lines is variable, the quensor may be charged or discharged slowly or quickly.

When a quensor is charged, and is disconnected from the electric power source or sink, it remains charged except for a small discharge rate due to resistive leakage across its terminals.

Figure 7:
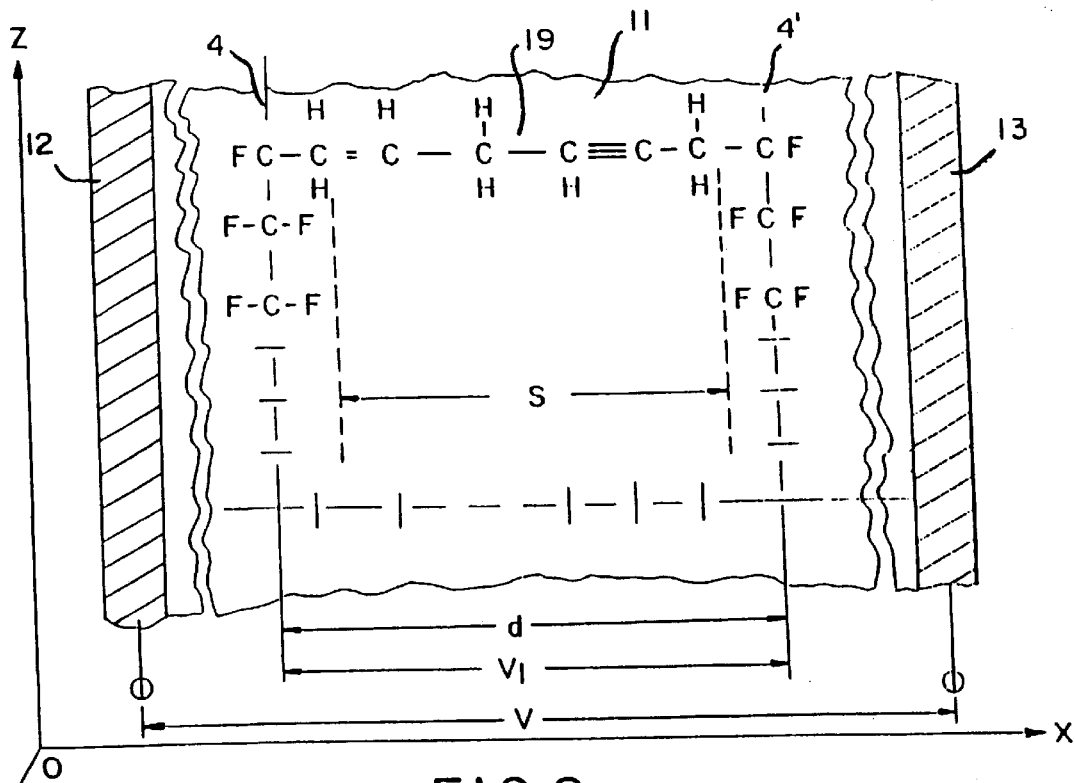
FIG. 7 is a chemical diagram of a molecular structure for storage or retrieval of electric energy, comprising a plurality of carbon dihalide groups on stretch oriented polymer chains separated by pillars.

FIG. 7 is a chemical diagram of a composition in a cutaway view of a quensor film 11 on the OZ plane, according to one embodiment of this invention. The composition comprises a plurality of pendant carbon dihalide groups 5, 5' on stretch oriented polymer chains 4, 4' and a crosslinked pillar group 19 between the chains. The pillar group 19 provides an optimum tunnel gap of about s=5–30 Å between adjacent donor-acceptor groups, and free space between donor and acceptor groups.

Polyethylene has a negative electron affinity. Consequently, electrons may tunnel through but do not attach to the polyethylene molecules.

Figure 8:
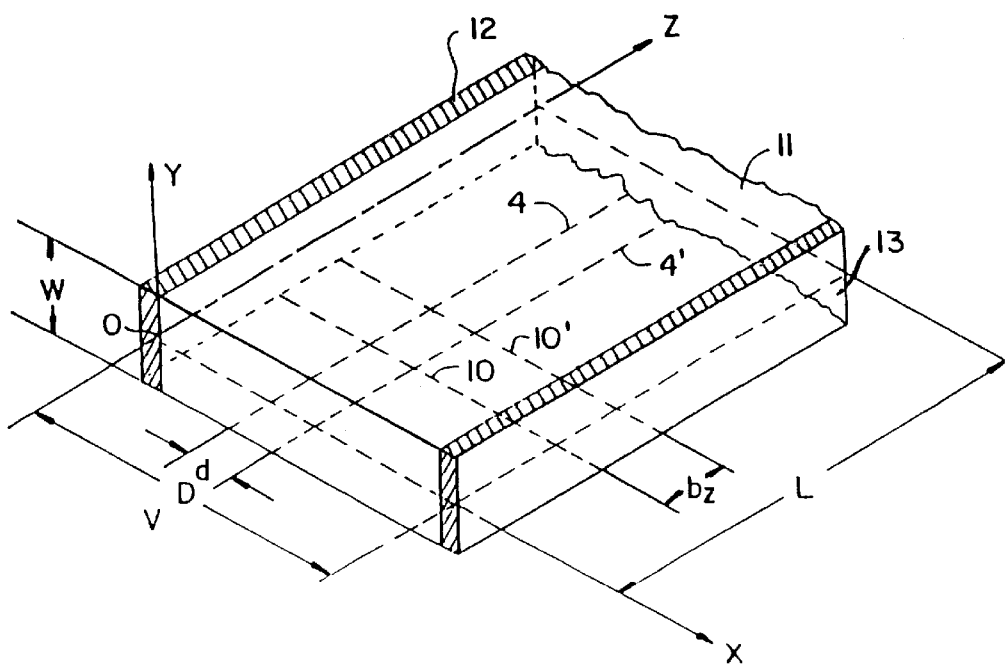
FIG. 8 is a cutaway perspective view on the YOX plane of a composite film for energy storage or retrieval, comprising polymer chains stretch oriented parallel to the OZ direction, having a plurality of spaced donor and acceptor structures.

FIG. 8 is an isometric view cutaway on the XOY plane of a quensor film comprising a stretch-oriented quensor film 11, having chains 4, 4' parallel to the OZ axis and q-lines 10, 10' parallel to the OX axis, and first and second metal layers 12 and 13 parallel to the YOZ plane on the surfaces of film 11. The ionization potential of fluorine is 17.4 eV [Table IV] and the distance between the carbon and fluorine atom is: 1.385 Å.[15.1] The distance between the 2 fluorine atoms is 2×1.385 Å. The internal electric field is therefore: 17.4 volts/2×1.385×$10^{-10}$=6.28×$10^{10}$ volts/m; enormous, yet stable because it is a part of an atomic quantum orbital. The positive ion is permanently stable and will store electric energy forever, unless discharged by an another electron from outside.
08.12

Manufacture

The synthesis of fluoropolymer —$(CF_2)_n$—may be performed in supercritical carbon dioxide at 207 bar and moderate temperature, i.e. 59.4° C.[12] The terminal groups may be modified to affix a polyethylene or other spacer group, and/or a rigid crosslinking spacer group.

The synthesis of two-dimensional polymer sheets has been described.[18] Long relatively stiff molecules are used having reactive groups at one end of each molecule, and a different reactive group at the center of the molecule. In solution, these molecules pair to form double length strands. The strands organize into a layer. There are two other reactive sites aligned in planes from the top and bottom of the layer. Two independent chemical reactions tie the molecular strands together at three different levels. This process may be used to fabricate a quensor of film of the composition shown in FIG. 7.

TABLE V

CONDITIONS FOR DISSOLVING PE AND PTFE

| Material | Solvent | Temperature °C. | Pressure Bars | Ref |
|---|---|---|---|---|
| Polyethylene (PE) | | | | |
| | toluene, xylene | | | |
| | amyl acetate | | | |
| | trichloroethylene | | | |
| | chlorinated hydrocarbons | >70 | 1 | [14.1] |
| | turpentine | | | |
| | hydrocarbons, tetralin | | | |
| | decalin, petroleum ether | | | |
| | pet. oil and paraffin | | | |
| Polytetrafluoroethylene (PTFE) | | | | |
| | fluorinated hydrocarbons | | | [16.1] |
| | fluorinated chlorocarbons | | | [16.1] |
| | supercritical carbon dioxide | 56 | 200 | [12] |

Figure 13:
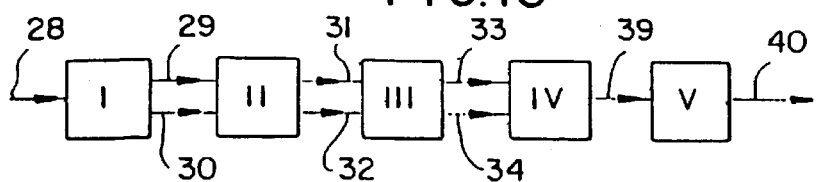
FIG. 13 is a block diagram of the steps of manufacture of a quensor film of this invention.

FIG. 13 shows a block diagram of the steps I through V in a process for the manufacture of Ensor$^{tm}$ film, described as follows:

In formulating a casting solution for a quensor film employing the polymers PE and PTFE, solvents and temperatures and pressures are chosen to dissolve these materials; for example, according to Table V.

I. Preparation of Film Solution

TABLE VI

FILM CASTING SOLUTION I

| MATERIALS | parts by weight |
|---|---|
| polyethylene PE polymer | x |
| polytetrafluoroethylene PTFE polymer | (0.01 to 0.001) x |
| Solvent Composition | 100-x |

1. The PE and PTFE polymers are dissolved in the solvents at the temperatures and pressures listed in Table V.
2. In Table VI, x depends on the required dry thickness of the cast film; for example: 0.1>x>10.
3. Medium and high boiling solvents for PE polymer are chosen from Table V, heated to about the temperature and pressure noted. The polymers are slowly added to the solvent, and the solution stirred until the polymers are dissolved.

II. Casting and Stretching
1. Polymer solution I is cast onto a chemically inert belt such as stainless steel, at about 80° C. The belt moves with a velocity $U_1$. The cast film is partially dried to remove the medium boiling solvents, leaving a little high boiling solvent in the film to facilitate stretching, and continuously stretched onto a second belt moving at a greater velocity $U_2$, for example:

$U_2/U_1 = 6$ to $8$

Referring to Table VI, x is adjusted to obtain the required thickness of the stretch-oriented film; for example, 300 Å to 1000 Å.

2. The residual high boiling solvent is eliminated by heating the stretch-oriented film on the second belt to about 150° C. for about 10 minutes.
3. A single casting and stretching machine may be used to produce rolls of quensor film for further processing. Referring to FIGS. 14–17 inclusive, two quensor films 31 and 32 may be wound into a single coil 44. For such a quensor coil 44, two identical casting and stretching machines provide continuous production.

III. Metallizing the Film
1. The quensor films 31 and 32 from step II are metallized from the vapor, or from an electroless solution. The metals may be, for example: aluminum, nickel, gold, etc. The metal is coated on the surfaces of the polymer film according to the patterns shown in FIGS. 14 and 15. The metal coating thickness is the minimum for continuity and high conductivity, about 50 to 100 Å, except at the edge strips 35 and 36, where the coating is thicker to contact the adjacent layer.

IV. Assembling the Composite Film in Layers
1. The quensor films 31 and 32 may be wound into a coil 44, shown in FIGS. 16 and 17. After winding, the coil 44 may remain a cylinder; or, may be flattened for use in flat assemblies.
2. Two quensor films 31 and 32 travel through metal coating stage III. Shielding means (not shown) protects the the insulating edge strips 37 quensor film 31, and 38 on quensor film 32. First and second metal layers 33 and 34 are deposited on the first and second quensor films 31 and 32, respectively. The edges of first metal layer 33, and the second metal layer 34, respectively extend to the left and the right over the edges of the coil 44, contact each other, and are connected to the terminals 47 and 48, shown in FIGS. 16 and 17.

Figure 9:
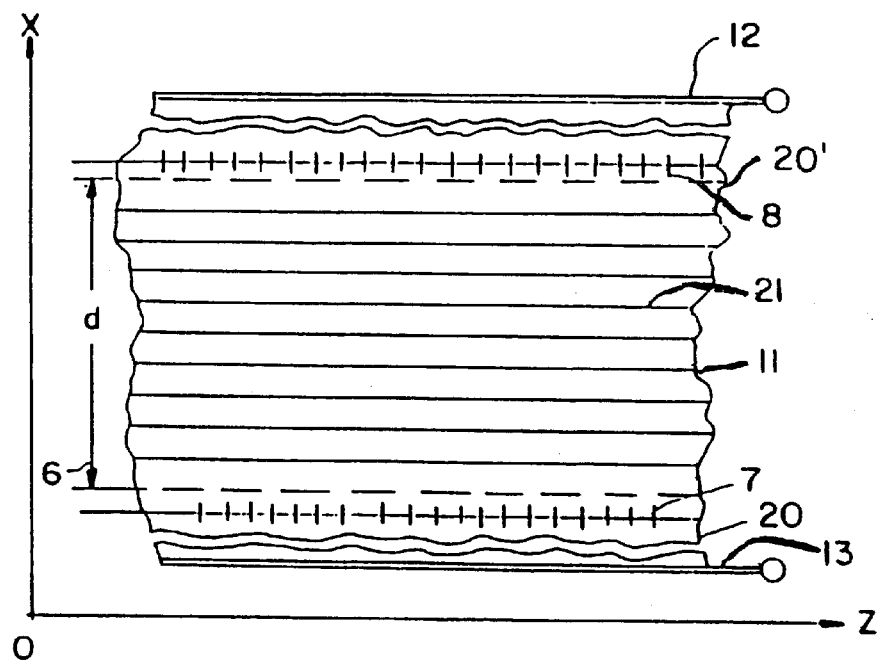
FIG. 9 is another embodiment of this invention comprising a composition of first and second polymer chains stretch-oriented parallel to the OZ direction, comprising insulating first polymer chains, and a proportion of second polymer chains having donor and acceptor groups.
Figure 10:
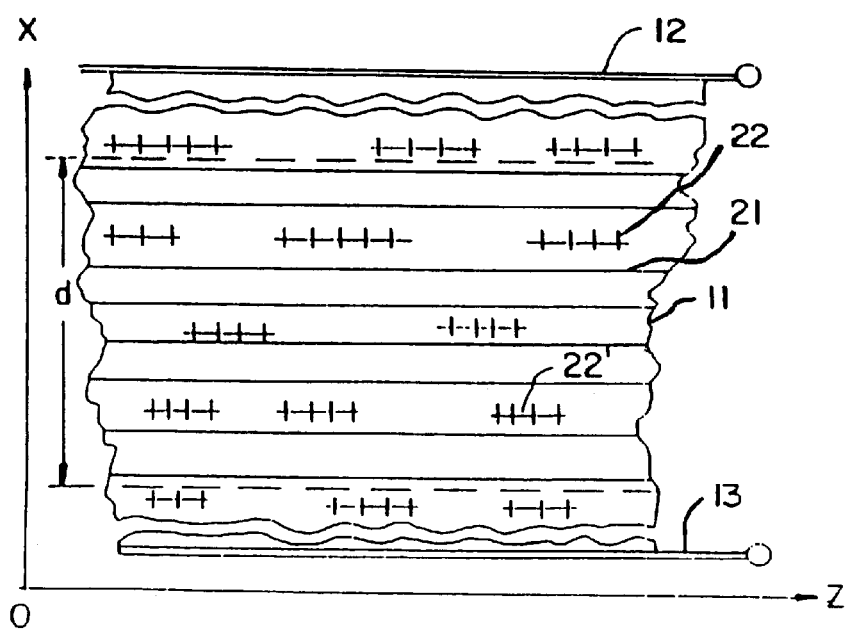
FIG. 10 is still another embodiment of this invention comprising insulating polymer chains stretch-oriented parallel to the OZ axis, interspersed with a proportion of shorter polymer chains having donor and acceptor groups.
Figure 11:
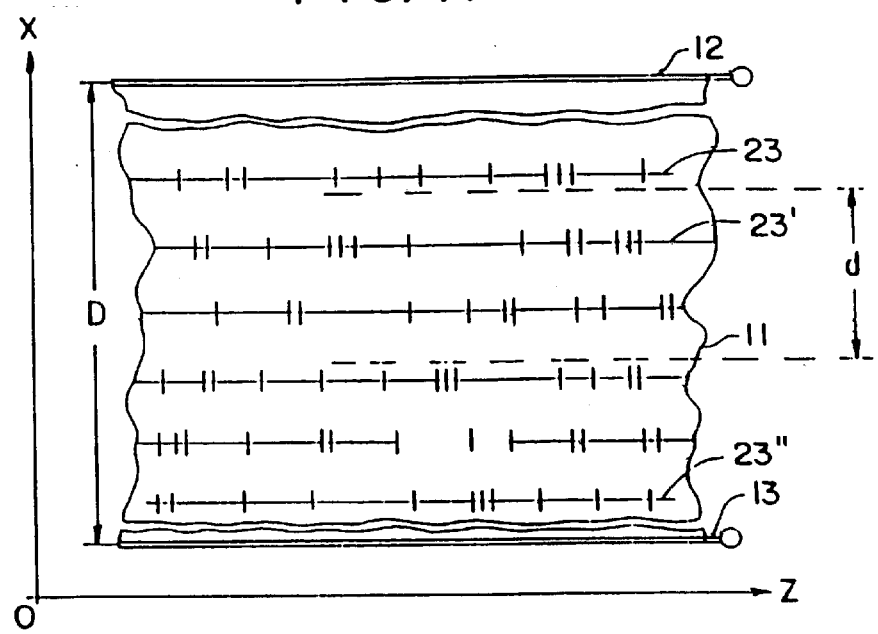
FIG. 11 is still another embodiment of this invention comprising copolymer chains stretch-oriented parallel to the OZ axis, each of which have insulating groups interspersed with a proportion of donor-link-acceptor groups.

FIGS. 9–11 inclusive are diagrams of other embodiments of this invention, showing cross sections on the XOZ plane, the OX axis being the q-line and electric field direction, and the OZ axis being the direction of the stretch oriented polymer chains.

Figure 12:
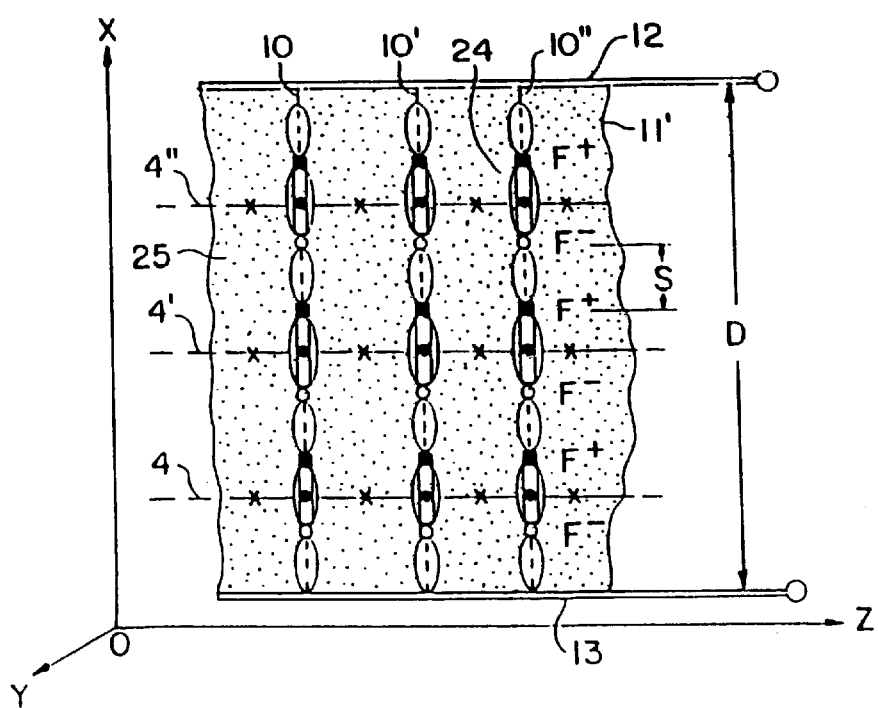
FIG. 12 is another embodiment of this invention, showing a cross section on the YOZ plane of a quensor film for energy storage or retrieval, comprising electroordered linear molecular or crystal cells in a q-line parallel to the OX direction.

FIG. 12 shows a diagram of another embodiment of this invention, also a cross section on the XOZ plane. The OX axis is the direction of the electric field and the q-line. The cells comprise spaced electroordered molecules 24, which were dissolved in a fluid material 25, and subsequently solidified.

FIG. 8 is a cutaway perspective view on the YOX plane of a quensor film 11. Also shown in FIGS. 9–11, film 11 comprises first polymer chains 20, 20', . . . stretch oriented parallel to the OZ direction, shown as lines 4, 4'" which have a plurality of pendant donor and acceptor groups, 7 and 8 respectively, and insulating second polymer chains 21 between the first polymer chains 20 and 20'. Metal layers 12 and 13, each about 80 Å thick, are deposited on the outer surfaces of the quensor film 11. The first polymer chains 20, for example, may comprise polytetrafluoroethylene (PTFE), and the second insulator polymer chains 21 may comprise polyethylene (PE). The PE has a negative affinity and repels electrons, which pass freely between the spaced first and second PTFE chains from a donor 7 on the first chain 20 to an acceptor 8 on the second chain 20'.

The quensor film 11 comprises a mixture of polymer chains 20 and 21. The chains 20 may comprise polyvinyl difluoride PTFE, in which the groups $(CF_2)_n$ act as donor and acceptor. As an acceptor fluorine has a positive electron affinity, and acts as an electron trap. The chains 21 may comprise an aliphatic group $(CH_2)_m$ which has a negative electron affinity and repels electrons. An example of chain 21 is polyethylene, PE. [2.4, 3.2] For example, a quensor film of this embodiment may have a ratio of about 3–20 chains of polyethylene PE to one chain of polytetrafluoroethylene PTFE. The PE chains 21 provide an average spacing of about 5–20 Å between the PTFE chains, enabling electrons to tunnel from a PTFE chain 20 to the adjacent PTFE chain 20'. This establishes a positive ion on a fluorine atom on chain 20, and a negative ion on a fluorine atom on chain 20', separated by a gap 6 through the intervening insulating PE chains 21. The Positive and negative ions charges on each side of the gap 6 in each cell establish dipole electric fields which store electric energy.

The positive and negative charges in each cell of the system are balanced. Consequently, there is no buildup of space charge voltage in the quensor film. The electric energy stored in each cell has a small volume. The electric energies stored in all the cells are additive.

FIG. 10 is another embodiment of a quensor film comprising first and second polymer chains, 21 and 22 respectively, stretch-oriented parallel to the OZ direction, comprising a large proportion of insulating first polymer chains 21, and a small proportion of second polymer chains 22 having pendant donor acceptor groups, which may be ionized, and gaps provided by the first polymer chains, to create dipole electric fields for energy storage or retrieval. The PE chains 21 are long and aligned by stretching parallel to the OZ axis. The PTFE chains are short with a low molecular weight. The short PTFE chains 22 are aligned between the long stretch-oriented PE chains 21. The short PTFE chains are in a small proportion with an average tunnel distance, for example s=5–22 Å between donor and acceptor groups.

FIG. 11 is still another embodiment of this invention in which copolymer chains 23 are stretch-oriented parallel to the OZ axis. The copolymer chains 23 comprise a long insulating chain linked to a proportion of short polymer chains or groups which have pendant donor acceptor atoms or molecules. An example of a copolymer chain 23 is a length of PE chain having a proportion of $CF_2$ groups along the chain.

The long PE chains and short lengths of PTFE chains or single carbon difluoride groups are chemically joined to provide an average critical tunnel distance. For example, a fluoroethylene and ethylene copolymer may be synthesized from their monomers having reactant end groups, by reacting the end groups in known manner. In such case, the helical structure of the PTFE polymer chain may be replaced with the linear zig-zag structure of the PE. In the quensor film the $CF_2$ group is poled to align it along a q-line. The ratio of insulating chain length to the length of donor acceptor groups along the chain is adjusted to obtain a mean gap s; for example, about 5–22 Å.

FIG. 12 is another embodiment of this invention, showing a cross section on the XOZ plane of an electroordered quensor film, comprising an electroordered dipole solution or suspension of a linear molecule 24, or crystal, in a cell with its long axis aligned parallel to the OX direction.[24.1] FIGS. 5 and 12 employ the symbols:
- ■ donor group
- ○ acceptor group
- * reaction site
- • solvent molecule A quensor film may be made by Electroordering molecules 24 in a casting solution. The molecules 24 may have the general composition:

$$R_1-(CH_2)_n-CF_2-(CH_2)_n-R_1 \tag{1}$$

The molecules 24 having donor-link-acceptor groups are dissolved or suspended in a fluid/solid medium 25. The molecules 24 may be structured as shown, the symbols having the assigned meanings:

(2)

An example of a molecule 24 is:

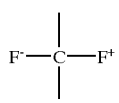

(3)

Upon electroordering molecules 24, a q-line is formed as in FIG. 5, and a plurality of q-lines 10, 10', 10", . . . are electroordered in lines parallel to the applied electric field. The spacing s and the distance between the parallel q-lines depends on the length of the molecule, and the concentration of the molecules 24 in the fluid/solid medium 25. The molecule 24 is aligned by an electric field along the OX axis while the medium 25 is liquid. The fluid 25 is solidified while the molecules are electroordered by the electric field. The solidification of the fluid may result from cooling by a change of phase from a liquid to a solid, or by crosslinking the liquid molecules 25.

As an example, the fluid may be paraffin wax which solidifies on cooling, or a monomeric liquid having reactive groups $R_1$, $R_2$, such as —OH or —COOH respectively, which polymerize or crosslink by exposure to UV light or heat, causing solidification. A voltage V applied across the quensor film 11' while it is liquid causes the donor-link-acceptor molecule, such as the molecule $F^-CF^+$ to align parallel to the OX axis, whereupon molecules 24 electroorder into a regular three dimensional structure. To minimize the length of the molecules in the q-lines 10, 10', 10", . . . , referring to Equation (1) n=1 or 2. The quensor film 11' is solidified while the field is applied, causing the molecules 24 to be permanently electroordered.

To make a thin uniform electroordered quensor film 11', the molecules 24 may be dissolved or suspended in a film-forming casting solution using the general composition described in TABLE VI. The quensor film 11' may be made by casting the solution onto a metal substrate. The film is flowcoated onto the substrate, and the electric field applied across the layer while the film is fluid. The molecules 24 are electroordered and fluid 25 is converted to a solid insulating film having a plurality of equispaced q-lines parallel to the OX axis. The electric field may be applied across the film 11' by an ion or electron spray onto the exposed face of the film. Subsequently metal layers 12, and 13 are coated on the surfaces of the solid quensor film 11, by evaporation or electroless coating in known manner.

Figure 14:
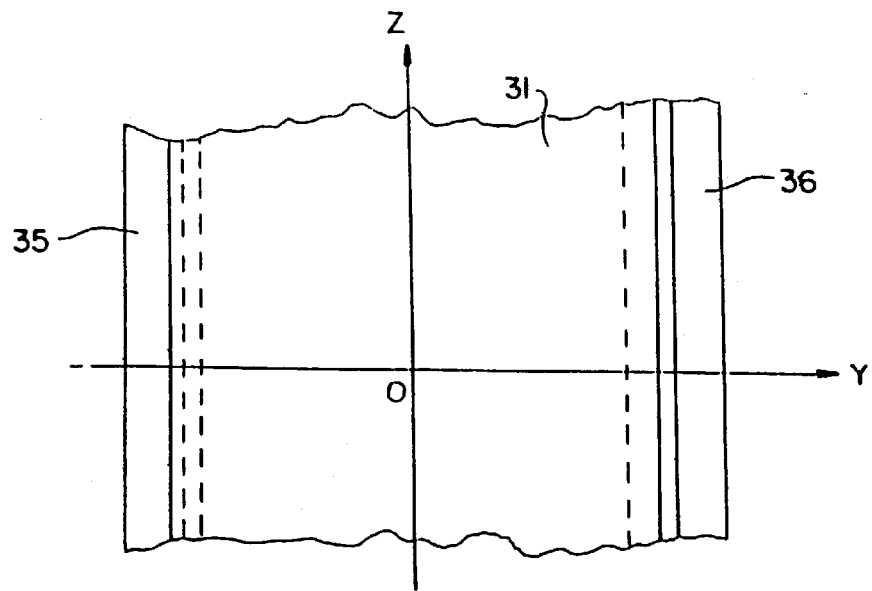
FIG. 14 is a plan view on the XOZ plane of an assembly of quensor films.
Figure 15:
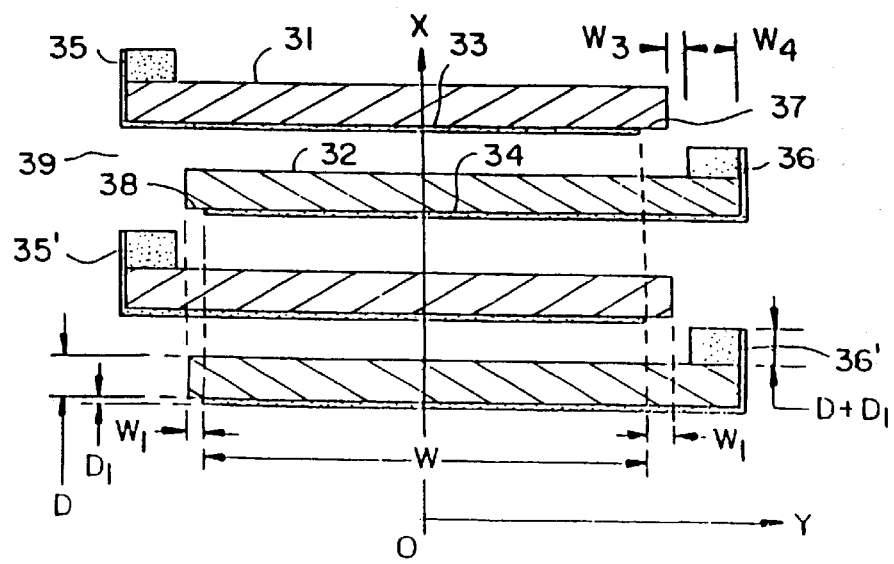
FIG. 15 is a cross sectional view on the XOY plane of an assembly of quensor films and their electrical connections.

FIG. 13 is a block diagram of the steps in the manufacture of a quensor film assembly. At Stage I the polymers and solvents listed in Tables V and VI are mixed to produce the casting solution 28. The casting solutions are supplied via pipes 29 and 30 to Stage II casting and stretching machines, previously dscribed.[23] Two rolls of quensor films 31 and 32 are required. The rolls may be provided successively by a single casting and stretching machine. For continuous production, two casting and stretching machines are utilized. At Stage III, first and second quensor films 31 and 32 are metal coated in known manner. During manufacture of the composite quensor film assembly 39, the edge strips 37 and 38 shown in FIG. 15 are protected from metal deposition by appropriate shielding in known manner. A vacuum chamber may be used to apply an about an 80 Å thick layer of aluminum; or an electroless coating may be applied at atmospheric pressure to form metal coatings 33 and 34 on quensor films 31 and 32 respectively. At Stage IV, the two metal coated rolls 31 and 32 are wound together, offset as shown in FIGS. 14 and 15 to make the composite film 39. The composite film 39 has electrode strips 35 and 36 at each edge to apply the voltage V across the quensor films 31 and 32. At Stage V the composite quensor film 39 is assembled into a casing assembly 40.

FIGS. 14 and 15 are views on the ZOX and YOX planes of the composite film assembly 39. FIG. 15 is an exploded section of the composite quensor assembly 39. The assembly 39 comprises a first quensor film 31 and second quensor film 32, each of thickness D; for example, 3000 Å. The first and second quensor films are coated with thin metal layers 33 and 34, such as, aluminum, thickness D; about 80 Å; spaced from their respective film edges by insulating film strips 37 and 38, which are about 3–4 mm wide to avoid electric shorting.

The metal coatings 33 and 34 extend over the edges of the quensor films 31 and 32, forming strips 35 and 36, respectively, of thickness $(D+D_1)$. The thickness of the edge strip electrodes 35 and 36 equals quensor film thickness D plus the metal layer thickness $D_1$.

The first and second quensor films may be assembled by winding the two films on a cylindric core, displaced along the "OY" axis as shown in FIGS. 14 and 15. The metal strip 36' contacts the metal layer 34, and the metal strip 35' contacts the metal layer 33. The strips 35 and 36 are thickened by additional exposure time during aluminum vapor coating until their thickness equals $D+D_1$. The edge strips 35 and 36 are bus bars, respectively, in continuous contact with metal layers 33 and 34. The films are assembled, so the metal layer 33 on the bottom of the first quensor film 31 contacts the upper surface of the second quensor film 32; applying the voltage V from the terminals 47 and 48 across the quensor film layers.

Figure 16:
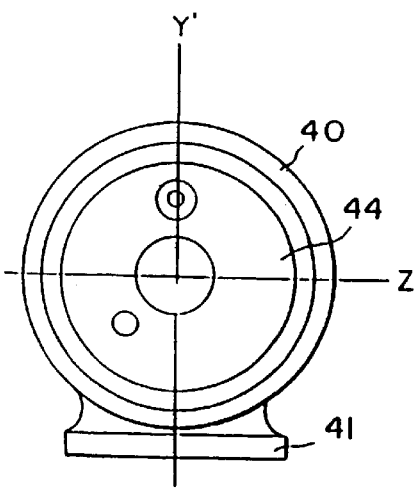
FIG. 16 is a cross section on the Y'OZ' plane of an assembled energy storage or retrieval device of this invention.
Figure 17:
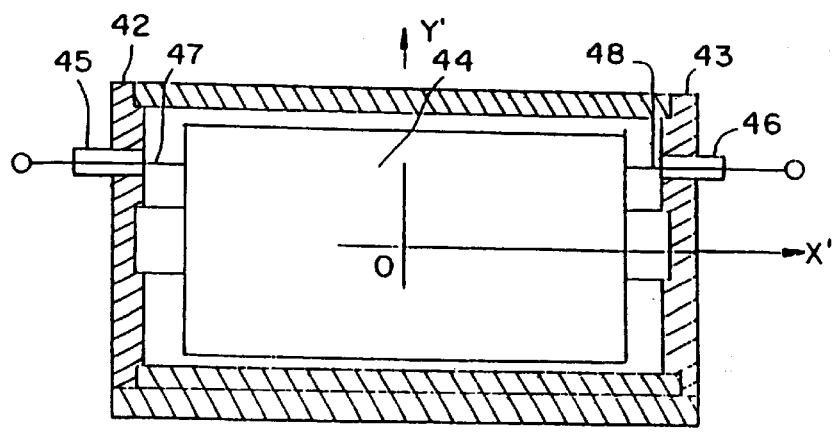
FIG. 17 is a cross sectional view on the X'OY' plane of the assembled device shown in FIG. 16.

FIGS. 16 and 17 are cross sections of an assembled electric energy storage or retrieval device of this invention on the Y'OZ' and X'OZ' planes, respectively. The assembled quensor device comprises a casing assembly 40 having a base support 41, enclosed by first and second end plates 42 and 43. A quensor film coil 44 is mounted within the casing 40. The edge strips 33 and 34 on the quensor coil 44 are connected through first and second leadin insulators 45 and 46, respectively to to the electric terminals 47 and 48 on the first and second metal layers 33 and 34 on the quensor coil 44. The leadin terminals 47 and 48 are connected to an electric energy source 15, or load 16, as shown in FIG. 5, via the switch 14. The casing 40 may be filled with $SF_6$ gas.

Figure 18:
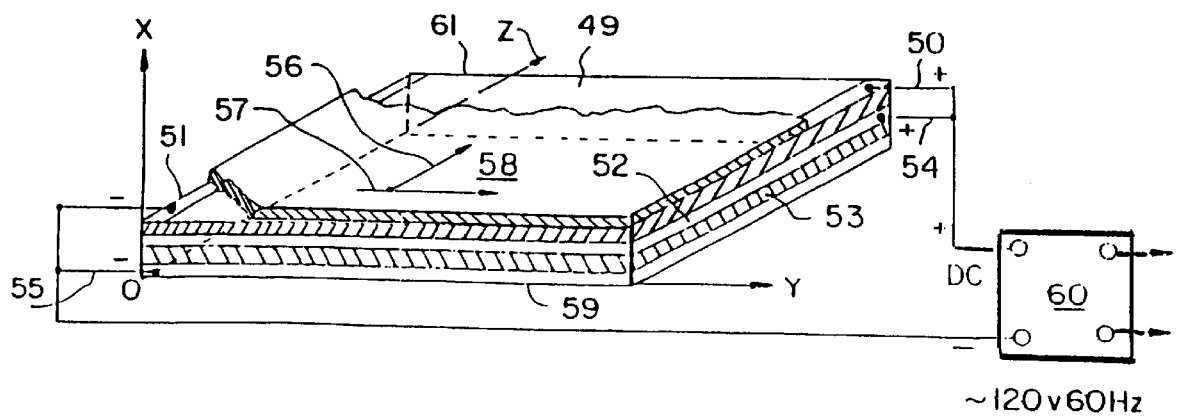
FIG. 18 is a isometric cutaway view of a combined photovoltaic-quensor panel for the storage of solar-electric energy, or the retrieval of the electric energy on demand day or night.

FIG. 18 shows a cutaway isometric view of a PVQ sheet 61, which comprises a photovoltaic sheet (PV-sheet) 49 and a quensor sheet (Q-sheet) 53. The PVQ sheet 61 converts and stores solar energy during the day, and provides electric energy on demand day or night.

The PV-sheet 49 and the Q-sheet 53 may be laminated in a unitary PVQ-sheet 61, with an insulating sheet 52 between them, a top protective transparent sheet 58, and a bottom protective sheet 59.

The sheet 49 may be a conventional PV sheet which presently has a low efficiency and high cost per watt ( i.e. 10% and several $/watt). However, for the PV sheet 49, it is preferred to employ the light-electric energy converter known as Lumeloidtm which has two light-polarizing electrically-conducting sheets with orthogonal polarizing axes 56 and 57; and electric outputs connected in series or parallel. [23] A thinner quensor sheet 53, with higher efficiency and lower costs is realized (i.e. 70% efficiency and 5 cents per watt for the PV sheet and about 2 cents per watt for the Q sheet).

The PVQ sheet may be connected to a DC-AC converter-inverter 60, known in the art, to change the high voltage DC to 120 v. 60 Hz electric output.

The uses for PVQ sheets 61 are vast: building panels for roofs and walls, and for solar energy farms to supply electric power on demand day or night to homes, factories and electric utilities.

08.2

| Mathematical Physics of Ensor | | |
|---|---|---|
| 08.20 | Symbols | |
| a | m | Thickness of film plus conductor |
| $b_x$ | m | Average C—X bond length. |
| $b_z$ | m | Average difference between z-coordinates of adjacent carbon atoms along a polymer chain. |
| $C, C_1$ | farad | Capacitance of q-line & single cell, resp. |
| D | m | Film thickness between conductors. |
| d | m | Through-film dimension of unit cell. |
| $E, E_c, E_1$ | eV | Energy stored per q-line, per cell, & per unit volume. |
| $E_a$ | eV | Electron affin. of dipole along its axis. |
| $E_i$ | eV | Ioniz'n potential of dipole along its axis |
| $E_{ug}$ | kWhr · kg$^{-1}$ | Useful energy per unit mass of gasoline |
| $E_{uq}$ | kWhr · kg$^{-1}$ | Energy to weiqht ratio for raw quensor. |
| f | 1 | Volume proportion of quensor composite consisting of quensor film. |
| N | 1 | Number of cells along line through film between conductive layers. |
| n | 1 | Number of gaps in a layer of thickness D. |
| $r_1, r_2$ | m | Inner Coulomb radius of C—X orbital and Coulomb separation of C—X orbital and adjoined orbital across the spacer gap. |
| s | m | Interdipole gap in through-film dimension. |
| $s_o$ | m | Length of C—X bond orbital in through-film dimension. |
| V | volt | Voltage between adjacent conductors. |
| $V_1$ | volt | Voltage across a single cell gap. |
| v | m$^3$ | Total composite film volume of a device. |
| $v_c$ | m$^3$ | Volume of active quensor film per dipole. |
| x, y, z | m | Position within composite material. Through-film depth axis, winding axis, and stretch-axis coordinates, resp. |
| $\varepsilon_o = 8.85 \cdot 10^{-12} \cdot \frac{farad}{m}$ | | Permittivity of free space. |
| $\epsilon, \epsilon_1$ | 1 | Dielectric constant of free space and of spacer material, respectively. |

08.21 Electric Equivalent Energy of Gasoline

For the purpose of this analysis, the Useful Energy per Unit Mass of gasoline $E_{ug}$ s defined herein as the mechanical energy per kilogram of gasoline required to propel a standard automobile with a 150 HP engine at a speed of 60 miles per hour, assuming that the automobile travels 20 miles per gallon of gasoline. In Kilowatts, the engine power is $$150 \cdot hp = 111.86 \cdot kW \tag{1}$$

The mass density of gasoline is $$0.65 \cdot \frac{gm}{cm^3} = 2.46 \cdot \frac{kg}{gal} \qquad (2)$$

In this example, 3 gallons of gasoline are used in one hour; i.e., $$\frac{3 \cdot gal}{cm^3} \cdot \left(2.46 \cdot \frac{kg}{gal}\right) = 7.38 \cdot \frac{kg}{hr} \qquad (3)$$

This same electric energy as in (1) will drive an equivalent automobile with an electric drive the same distance. Hence the electric storage device must deliver the same energy per unit of weight as that delivered by gasoline; or, from (1) and (3):

$$E_{ug} := \frac{112 \cdot kW}{7.38 \cdot kg \cdot hr^{-1}} = 5.46 \cdot 10^7 \cdot \frac{joule}{kg} = 15.18 \frac{kWhr}{kg} \qquad (4)$$

08.22 Energy/Weight Ratio

Energy Per Cell

The energy E stored in the electric field of a dipole is $$E := \frac{e^2}{4 \cdot \pi \cdot \varepsilon_0 \cdot \varepsilon \cdot r} \qquad joule \qquad (1)$$

SYMBOLS $e := 1.60219 \cdot 10^{19} \cdot coul$ — Charge on the Electron $\varepsilon_0 = 8.854 \cdot 10^{-12} \cdot \frac{farad}{m}$ — Permitivity of Space $\varepsilon := 1.0$ — Dielectric Constant of Space $k := \frac{e^2}{4 \cdot \pi \cdot \varepsilon_0 \cdot \varepsilon}$ $k = 2.307 \cdot 10^{-28} \cdot joule \cdot m$ $r0$ — m — Distance of outer electron from its nucleus in a Fluorine atom $E_i := 17.42 \cdot e \cdot volt$ — Ionization Potential of single Fluorine atom [ ] (2)

Equation (1) becomes:

$$r_0 := \frac{k}{E_i} \quad m \qquad (3)$$

$$r_0 = 8.266 \cdot 10^{-11} \cdot m \qquad (4)$$

The external energy E1 stored in the gap 8 between the donor and the next acceptor is:

$$E_1(s) := k \cdot \left[\left(\frac{1}{r_0}\right) - \left(\frac{1}{s}\right)\right] \qquad (5)$$

$$E_1(20 \cdot 10^{-10} \cdot m) = 16.7 \cdot e \text{ volt} \qquad (6)$$

In the FCF group the distance between the nuclei of the F and C atoms is 1.385 A; and therefore the distance s0 between the two F nuclei is 2×1.385 A:

$$s_0 = 2 \cdot 1.385 \cdot 10^{-10} \cdot m \qquad (7)$$

The internal energy E2 stored in the intermolecular space s0 between the donor and the preceding acceptor is:

$$E_2 = E_1(s_0)$$

$$E_2 = 12.222 \cdot e \cdot volt \qquad (8)$$

The total electric field energy E(s) stored per cell is the sum of the external electric field energy E1 and the internal electric field energy E2:

$$E(s) = E_1(s) + E_1(s_0) \qquad (9)$$

For s=10 A, the total energy E stored in the external and internal electric fields is:

$$E(10 \cdot 10^{-10} \cdot m) = 28.202 \cdot e \cdot volt \qquad (9)$$

The cell dimensions are length d, width bz and thickness by, with bz=by=b; where bz is the distance 1.54 A between C—C atoms along the polymer chain.[ ]

$$b = 1.54 \cdot 10^{-10} \cdot m \qquad (10)$$

The cell length is:

$$d(s) = s + s_0 \qquad (11)$$

The cell volume is:

$$v(s) = b^2 \cdot d(s) \qquad (12)$$

$$v(10 \cdot 10^{-10} \cdot m) = 3.029 \cdot 10^{-29} \cdot m^3 \qquad (13)$$

Energy per unit volume $\phi$ is:

$$\Phi := \frac{E(s)}{v(s)} \quad joule/m3 \qquad (14)$$

$$\Phi := \frac{E(10 \cdot 10^{-10} \cdot m)}{v(10 \cdot 10^{-10} \cdot m)} \quad joule/m3 \qquad (15)$$

$$\Phi = 1.492 \cdot 10^{11} \cdot \frac{joule}{m^3} \qquad (16)$$

To convert joule to kwhrs divide by 3,600,000, and to convert m3 to kg use the density of water δ=1000 kg/m3, divide again by 1000. The energy per unit weight is then $\phi$, and in terms of the units joule/kg for δ=1 gm/cm3 is:

$$\Phi \cdot \left(1 \cdot \frac{liter}{kg}\right) = 41.443 \cdot \left(\frac{kW \cdot 3600 \cdot sec}{kg}\right) \qquad (17)$$

kwhrs/kg for s=10 A, $$\delta = 1 \text{ gm/cm} \qquad (18)$$

Ratio for Raw Quensor Material

The cell volume $v_c$ may be computed for the $CF_2$ system knowing the C—C bond distance of 1.54 Å, the C—F bond distance 1.32 Å, and the tunnelling distance s=22 Å. The cell length is then $$\left(22 + 1.32 \cdot \sqrt{\frac{8}{3}}\right) \cdot \frac{nm}{10} = 24.16 \cdot \frac{nm}{10} \approx 25 \text{ Å} \qquad (1)$$

The cell volume is then (assuming chain spacing is 2 Å)

$$v_c := \left(\sqrt{\frac{8}{3}} \cdot 1.54 \cdot \frac{nm}{10}\right) \cdot \left(2 \cdot \frac{nm}{10}\right) \cdot \left(25 \cdot \frac{nm}{10}\right) \qquad (2)$$

i.e., $v_c = 125.74 \cdot \left(\frac{nm}{10}\right)^3$

The number of cells per unit volume is $$\frac{1}{v_c} = 7.95 \cdot 10^{27} \cdot \frac{\text{cell}}{\text{m}^3} \qquad (3)$$

The electric dipole field energy stored per cell is twice the energy per dipole, since there are two dipoles per cell:

$$E_c := 2 \cdot (10 - 3) \cdot eV \text{ or } E_c = 2.24 \cdot 10^{-18} \cdot \frac{\text{joule}}{\text{cell}} \qquad (4)$$

The electric energy stored per unit volume is, from (3) and (4), $$\frac{E_c}{v_c} = 4.96 \cdot \frac{\text{kWhr}}{\text{liter}} \qquad (5)$$

Assuming a mass density near that of water, this becomes $$\left(4.29 \cdot \frac{\text{kWhr}}{\text{liter}}\right) \cdot \left(1 \cdot \frac{\text{kg}}{\text{liter}}\right)^{-1} = 4.29 \cdot \frac{\text{kWhr}}{\text{kg}} \qquad (6)$$

For an intersheet spacing of 5 Å, the corresponding energy storage density is $$\frac{2 \cdot (7.56961) \cdot eV}{\left(\sqrt{\frac{8}{3}} \cdot 1.54 \cdot \frac{nm}{10}\right)^2 \cdot \left(5 \cdot \frac{nm}{10}\right)} \cdot \left[\frac{5 + \sqrt{\frac{8}{3}} \cdot 1.32}{.92 \cdot 5 + 2.25 \cdot \sqrt{\frac{8}{3}} \cdot 1.32} \cdot \frac{\text{liter}}{\text{kg}}\right] = \qquad (7)$$

$$16.13 \cdot \frac{\text{kWhr}}{\text{kg}}$$

Ratio for Quensor Composite, Allowing for Packing Factor

When the material is to be used in the multilayer form, allowance must be made for the volume of the conductor layers.

$$a := (2 \cdot 80 + 1200) \cdot \left(\frac{nm}{10}\right) \quad \text{Combined thickness} \quad a = 1360 \cdot \left(\frac{nm}{10}\right) \qquad (8)$$
two metal layers
(80 Å each), & one
quensor film layer
(1200 Å).

$$f := \frac{1200 \cdot (.1 \cdot nm)}{a} \quad \text{film layer proportion} \quad f = 0.88 \qquad (9)$$
of $a$ above.

Let the energy-to-weight ratio for raw quensor material be $$E_{uq} = 11.73 \cdot \text{kWhr} \cdot \text{kg}^{-1} \qquad (10)$$

Since the layer proportion is also the volume proportion, which is the ratio of active to total volumes of material, the energy density stored in the bulk quensor composite is accordingly the product, $$f E_{uq} = 10.35 \cdot \text{kWhr} \cdot \text{kg}^{-1} \qquad (11).$$

The mass density of the film layer and insulator are about the same, approximately that of polyethylene. Taking Aluminum as the metal, the resulting bulk mass density for the quensor composite material follows:

$$\delta_{Al} := 2.7 \cdot \frac{\text{kg}}{\text{liter}} \quad \text{(mass densities of} \quad \delta_P := 1.36 \cdot \frac{\text{kg}}{\text{liter}} \qquad (12)$$
Aluminum and film
layer, respectively)

$$\delta_c := (1 - f) \cdot \delta_{Al} + f \cdot \delta_P \quad \text{Density of quensor} \quad \delta_c = 1.52 \cdot \frac{\text{kg}}{\text{liter}} \qquad (13)$$
composite.

Combining these values, we arrive at the energy storage per unit volume of composite material:

$$f \cdot E_{uq} \cdot \delta_c = 15.71 \cdot \frac{\text{kWhr}}{\text{liter}} \qquad (14)$$

08.23

Charging and Discharging a Quensor

FIG. 4 is a graph of energy in eV stored in the electric fields of a cell 9, 9', versus s the distance across tunnel gap 6. Before the Fluorine atom 7 is ionized, the electron is closely held in an internal dipole in the orbitals of its covalent bond 3. For an ionization potential of 17.4 eV the internal dipole radius of the covalent bond is $r_0 = 0.83$ Å. Here the dielectric constant $\in = 1$ of free space prevails. To ionize the halide atom, energy is provided by an external electric energy source to the dipole to remove an electron from the radius $r_0$ of the C—X bond orbital and to enable it to tunnel across the gap s to the acceptor Å. The gap 6 may be filled with a nonionizing spacer material, for example stretch-oriented polyethylene molecules, dielectric constant $\in_1 = 2.2$. Polyethylene has a negative electron affinity; hence, electrons will tunnel through, but will not attach to polyethylene molecules. [3.2]

In charging the q-line 10 an electron tunnels from a donor 7 across each gap 6 to an acceptor 8, and finally to the conducting layer 13 to the electric energy source 15. A terminal of the source 15 is connected to the conducting layer 13 which supplies an electron to the q-line 10. In charging the q-line 10, electrons move across each gap and remain on an acceptor. The positive and negative ions, the electric dipole fields between them, and the electric energy stored in the field persist until the entire q-line is discharged.

When the device is fully charged the potential difference is V volts; where $$V = nV_1 \qquad (2)$$

n=number of gaps in a layer thickness D
$V_1$=voltage across each cell

2. Discharging: The device is discharged by connecting its positive nd negative conducting layers 12 and 13, respectively, to the load 16. In each cell an electron moves from a donor to an acceptor. At the nth cell an electron discharges on the positive electrode 13. In dischargin a q-line the positive and negative charges on the donors and acceptors simultaneously neutralize each other, and all the electric charges and electric fields cease to exist. Their total electric energy E is delivered to the load 16; where:

$$E = nE_1 = neV_1 = eV \text{ joules} \quad (3)$$

The Number of cells N between the conducting layers 12 and 13 depends on the film thickness D, and the length d of a cell:

$$N = D/d \quad (4)$$

and d, the length of each cell is the sum of the orbital length $s_o$ along the link 9 between acceptor ion 8 and donor ion 7, and the length of the gap s:

$$d = s_o + s \quad (5)$$

Let the donor 7 be fluorine, the acceptor 8 also fluorine, linked by a carbon atom 9, in a q-line 10 along the OX direction. The carbon atom is also attached to a polymer chain along the OZ direction. As an example, the polymer chain polytetrafluoroethylene, is shown in FIG. 5.

EXAMPLE 1

$$s_o = 1.385 \times 2 = 2.77 \text{ Å } [1.4, 2.2] \quad (7)$$

For s=27 Å, d is about 30 Å

The voltage $V_1$ across each gap 2 is: [3.1,3.2]

$V_1$=about 17.3 volts

For V=1730 volts, film thickness D between the conducting layers:

$$D = d \, V/V_1 = 3000 \text{ Å} = 0.3 \, \mu m \quad (8)$$

If a quensor is charged, and disconnected from the electric power source or sink, it remains charged except for a small discharge rate due to reistive leakage across its terminals. [Sec.08.24]

FIG. 6 is an equivalent electric circuit of a q-line shown to aid in understanding FIG. 5. The circuit comprises a plurality of condensers 17, 17', 17" . . . , 17n, respectively: C1, C2, C3, C4, . . . , Cn of equal capacitance $C_1$: the condensers are connected in series along the q-line 10.

Charging

The condensers are charged by electric power source 15 at voltage V; or discharged through the load 13. During charging a voltage $V_1 = V/n$ is applied across each condenser 19, 19' . . . Electric charges +q and −q appear on opposite electrodes of each condenser. The electric energy $E_1$ is stored in the electric field in each condenser:

$$E_1 = \tfrac{1}{2} C_1 V_1^2 \quad (9)$$

The total Capacitance C of a series of condensers each of capacitance $C_1$ is:

$$E = n \, E_1 = n \tfrac{1}{2} C_1 V_1^2 \quad (10)$$

$$C_1 = nC \quad (11)$$

From (11) and (12), when a voltage V is applied across the all the series capacitors the total energy E stored is the sum of the energy stored in each capacitor:

$$E = n \, \tfrac{1}{2}(nC)(V/n)^2 \quad (12)$$

which simplifies to:

$$E = \tfrac{1}{2} CV^2 \text{ joules} \quad (13)$$

Discharging

When the series of charged condensers are connected to a load 16, the the +q charge on condenser $C_n$ flows through the load 16 and discharges the −q charge on condenser $C_1$. Instantly all the +q and −q charges flow together along each of the conducting links 9, 9', 9" . . . , and neutralize each other. The electric fields between all of the capacitors 19, 19', 19" . . . , 19n disappear, and all their electric field energies are simultaneously delivered to the load 16.

If condensers in series are charged, and disconnected from the electric power source or sink, they remain charged except for the small discharge rate due to resistive leakage across the terminals.

| | |
|---|---|
| $A$ | Area of quensor film (normal to q-line). |
| $C_1 = 2\dfrac{E_1}{V^2}$ | Equivalent capacitance |
| $D$ | Film thickness |
| $d := \left(10 + 1.32 \cdot \sqrt{\dfrac{8}{3}}\right) \cdot 1 \cdot nm$ | length of unit cell in q-line dimension |
| | $d = 12.16 \cdot (.1 \text{ nm})$ |
| $E_1 = \dfrac{1}{2} \cdot C_1 \cdot V^2$ | Energy of quensor film per unit area, = energy corresponding to capacitance $C_1$. |
| $E_c = 14 \cdot eV$ | Energy per cell |
| $E_x = \dfrac{V}{D}$ | Electric field across film |
| $N_1 = \dfrac{D}{v_c}$ | Number of unit cells per unit area of quensor sheet of thickness $D$. |
| $n_x = \dfrac{D}{d}$ | Number of units cells in $x$ dimension in a film of thickness $d$ |
| $R = \rho \cdot L \cdot A^1$ | Resistance of nominally open circuit Voltage across film. |
| $V = n_x \cdot V_1$ | Volume across film. |
| $v_c = 0.13 \cdot nm^3$ | Volume of unit cell |

-continued $\rho := 10^{18} \cdot \text{ohm} \cdot \text{cm}$     Lower bound on the resistivity of unoriented PTFE [10.3]

$\tau = R \cdot C_1$     Discharge time constant.

$D := 3000 \cdot (.1 \cdot \text{nm})$ $N_1 := \dfrac{D}{v_c}$     $N_1 = 2385.87 \cdot \text{nm}^{-2}$ $E_1 := N_1 \cdot E_c$     $E_1 = 5351.66 \cdot \dfrac{\text{joule}}{\text{m}^2}$ $n_x := \dfrac{D}{d}$     $n_x = 246.8$ $V_1 := E_c \cdot e^{-1}$     $V_1 = 14 \cdot \text{volt}$ $V := n_x \cdot V_1$     $V = 3455.21 \cdot \text{volt}$ $E_x := \dfrac{V}{D}$     $E_x = 1.15 \cdot 10^{10} \cdot \dfrac{\text{volt}}{\text{m}}$ $C_1 = 2 \cdot \dfrac{E_1 \cdot A}{V^2}$ $\tau = R \cdot C_1 = \left(\rho \dfrac{D}{A}\right) \cdot \left(2 \dfrac{E_1 A}{V^2}\right) = 2 \cdot \rho \dfrac{E_1}{E_x^2} \cdot \dfrac{1}{D}$ $\tau := 2 \cdot \rho \dfrac{E_1}{E_x^2} \cdot \dfrac{1}{D}$     $\tau = 1.02 \cdot \text{month}$ [lower bound]

This is the logarithmic time constant, i.e., the time required for the charge to decrease by a factor of the natural lograrithmic base e≈2.718281828 . . . to approximately 36.79% of its initial value.

8.25 Application: Lumeloid/Quensor Panel

Average monthly total solar radiation at sea level has been tabulated [2.5]. For 45° N Latitude, the values are $w :=$ $(6.7 \quad 10.3 \quad 14.8 \quad 19.5 \quad 22.6 \quad 23.9 \quad 23.2 \quad 20.1 \quad 15.8 \quad 11.5 \quad 7.8 \quad 5.9) \dfrac{\text{kcal}}{\text{month} \cdot \text{cm}^2}$ $w := \text{mean}(w^T)$ In kWhr/day-sq.m.: $w = 5.8 \cdot \dfrac{\text{kWhr}}{\text{day} \cdot \text{m}^2}$ Multiply this by the proportion (taken from the tabulated value [2.6] known to obtain above the troposphere), 38%, of radiant power that falls within the visible range (wavelengths 4000 to 7000 Å), and by the maximum theoretical efficiency of Lumeloid, 78%, to arrive at the daily energy generated by Lumeloid, per unit area:

$(0.78) \cdot (0.38) \cdot w = 1.72 \cdot \dfrac{\text{kWhr}}{\text{day} \cdot \text{m}^2}$ (The assumption of maximial efficiency counters the conservative assumption that only radiation within the indicated spectral range is used.) The thickness of a parallel laminate of quensor film required to store this much energy per unit area (per day, for use during the night) is $\dfrac{1.72 \cdot \dfrac{\text{kWhr}}{\text{m}^2}}{\left(10 \cdot \dfrac{\text{kWhr}}{\text{kg}}\right) \cdot \left(1 \cdot \dfrac{\text{kg}}{\text{liter}}\right)} = 0.17 \cdot \text{mm}$ under the assumption that the quensor film stores 10 kWhr per kg and has density about the same as water.

REFERENCES

1. *Organic Chemistry*, K. P. C. Vollhardt, 1987, W. H. Freeman and Company, New York
   1.1 Covalent Bond, p.8
   1.2 Electron Affinity pp. 9–10, Table 1–3
   1.3 Ionization Potential pp. 9–10, Table 1–2
   1.4 Carbon Halide Bond, p.190, FIG. 6-1
2. *Handbook of Chemistry and Physics*, 65 th Ed., R. C. Weast, 1984–85, CRC Press, Inc., Boca Raton Fla.
   2.1 Dielectric Constants and Electric Breakdown Strengths of Materials Table pp. E55–56
   2.2 Bond Lengths F 166
   2.21 Definition F 107
   2.3 Ionization Potentials Atoms E 63–64; Molecules E 70–74
   2.31 Definition F 87
   2.4 Electron Affinities of the Elements E 62
   2.41 Definition: F 87–88
   2.5 Total Monthly Radiation in a Cloudless Sky, F 148; values used are those given for 45° N Lat.
   2.6 M. P. Thekaekara, (NASA, ed.), Solar Spectral Irradiance, F 147 Column $D_{lambda}$, Percentage of Solar Constant Associated w. Wave-lengths Shorter than lambda. The values for 700 nm and 400 nm are 46.879% and 8.725%, resp.; the difference is 38.15%.
3. *Bond Energies, Ionization Potentials and Electron Affinities*, V. I. Vedeneyev, et al,. translated by Scripta Technica, Ltd., London, Edward Arnold (Publishers Ltd)
   3.1 Ionization Potentials pp.151–189
   3.2 Electron Affinities pp.191–198
4. *Color and Constitution of Organic Molecules*, John Griffiths 1976 Academic Press New York
   4.1 Donor Groups Table p.142
   4.2 Acceptor Groups Table p.145
5. *Hyper and Ultrahigh Frequency Engineering*, Sarbacher & Edson, March 1944, John Wiley & Sons, Inc., New York
   5.1 Induced Dipoles, Polarization pp.21–22
   5.2 Electric Energy required to establish Charge on a Capacitor, Equation [1.58], page 22;
6. "Goals for Advanced Batteries", source: U.S. Advanced Battery Consortium, Idaho National Engineering Laboratory, and the Electric Power Research Institute; Gary Stix, pages 126–127, Table on p. 127, *Scientific American* May 1992, Article in Science and Businesss Section entitled "Electric Car Pool"
7. "Electrical Breakdown in Thin Dielectric Films" Franco Forlini and Nicola Minnaja, *J.Vac. Sci. Technol.* Vol. 6 (1969) 518–526
8. "Promising Storage Capacitor Structure with Thin $Ta_2 O_5$ Film for Low-Power High Density DRAM'S"; Shinriki et al, IEEE Transactions on Electron Beam Devices Vol. 37 No. 9, September 1990 pp.1939–1947; FIG. 4, p.1942
9. "Improved Self-discharge Characteristics of the Electric Double Layer Capacitor", Suzuki, Katsu and Okamoto, p 118–123, *NEC Res.& Develop.* No.82, July 1986

10. *Electrets,* Topics in Applied Physics, Volume 33, Edited by Gerhard M. Sessler, Springer-Verlag, New York 1987 Greatest Observed Charged Densities and full trap densities in one sided metallized dielectric films:
   10.1 p. 56, Table 2.3
   10.2 p.74 line 6
11. *Preparation, Properties and Industrial Applications of Organo-fluorine Compounds,* R. E. Banks Halsted Press, a division of John Wiley & Sons, New York. Carbon Fluoride, Chapter 9, p 297–322.
12. "Synthesis of Fluoropolymers in Supercritical Carbon Dioxide", J. M. DeSimone, Zhiban Guan, C. S. Elsbernd, pp. 945–947, 25 ref., *Science* Vol. 257, Aug. 14, 1992
13. *Polyethylene,* R. A. V Raff and J. B. Allison, High Polymers Volume XI, 1956, Interscience Publishers, Inc. New York
14. *Polyethylene: Preparation, Structure and Properties,* S. L. Agarwal and O. J. Sweeting, pp.665–742, Chem.Rev. 57, 1957 Olin Mathieson Chemical Corporation New Haven 4, Conn.
   14.1 Solubility pp.705–709; refs.: pp.729–742; 412, 155, 338, 343, 356, 418, 468, 515
15. *Introduction to Organic Chemistry* Streiweiser & Heathcock, 1981 2 nd Ed. Macmillan Publishing Co. N.Y.
   15.1 p.147 CF Bond Distance 1.385 Å
   15.2 p.278 CC Bond Distance 1.54 Å
16. "Do Hydrofluorocarbons Destroy Stratospheric Ozone?" A. R. Ravishankara, etal pp. 71–75, *Science* Vol.263, Jan. 7, 1994
   16.1 p. 73 Table 2 ODP potentials of various hydrofluorocarbons
17. *Polymer Single Crystals,* P. H. Geil, Wiley Interscience New York, 1963
   17.1 p18 FIG. I-6 Molecular Models of:
     (a) polyethylene repeat distance for $CH_2$ units 2.55 Å
     (b) and (c) polytetrafluorethylene $CF_3$ a helix
18. "Synthesis of Two-Dimensional Polymers", S. I. Stupp, S., H. C. Lin, L. S. Li , pp. 59–63, *Science* Vol.259, Jan. 1, 1993
   Samuel I. Stupp et al are at the University of Illinois at Urbana Champaign.
19. "Polarization of poly(vinylidene fluoride) by application of breakdown fields", T. T. Wang and J. E. West Bell Laboratories, Murray Hill N.J., *J.Appl. Phys.* Vol.53 No.10, October 1982
20. *Introductory Quantum Mechanics* Vladimir Rojansky 1946 Prentice Hall, New York Chapter VI One-Dimensional Probability Currents and De Broglie Waves A; Rectangular Barrier p.211–217
   20.1 Tunnelling Equation: p.216 Equ.10
21. "Nature of Biological Electron Transfer" Moser, Keske, Warnke, Farid & Dutton, pages 796–802, *Nature,* Vol.355, Feb. 27, 1992, Equation Summary p.798, particularly (2); and FIG. 5, graph k vs.Distance of Donor to Acceptor in A.
22. "Characteristics of a 1 kA vacuum arc plasma gun for use as a metal vapor deposition source". Bowman R. L., Goldsmith S. *Surf. Coating Technol.* v 44 n 1–3 Dec. 10, 1990 17th International Conference on Metallurgical Coatings and 8th International Conference on Thin Films, San Diego Calif. Apr. 2–6, 1990, p 1024–1034.
23. U.S. patent application AM 264, entitled "Oriented Polyacetylene Film and Applications" a continuation-in-part of U.S. Pat. No. 5,229,624 issued Jul. 20, 1993 to Alvin M. Marks; for:
   23.3 FIG. 16 from Experimental Results Col 21, Table 09.4
24. U.S. Pat. No. 4,442,019, entitled "Electroodered Dipole Suspension" issued Apr. 10, 1984 to Alvin M. Marks.
   24.1 FIGS. 6,7,9
11.0

NUMBER KEY

| ITEM NO. | FIG. NO. | DESCRIPTION |
|---|---|---|
| 1 | 1 | Carbon Orbitals |
| 2 | 1 | Halide Obitals |
| 3 | 1 | Shared Electrons in Covalent Bond |
| 4, 4' | 2 | Stretch-oriented Polymer Chains |
| 5, 5' | 2 | Pendant Groups on Polymer Chain 4 |
| 6 | 2, 3, 5 | Tunnel Gap between donor and acceptor |
| 7 | 2, 3, 5 | Donor |
| 8 | 2, 3, 5 | Acceptor |
| 9, 9' | 2, 3, 5 | link midpoint, C atom in polymer chain |
| 10 | 2, 3, 5 | q-Line or Quensor Line parallel to OX axis |
| 11 | 2, 5, 8 | Quensor Film |
| 12 | 5, 7, 8, 12 | First Electrode on Quensor Film Surface |
| 13 | 5, 7, 8, 12 | Second Electrode on Quensor Film Surface |
| 14 | 5, 6 | Switch SPDT |
| 15 | 5, 6 | Electric Energy Source |
| 16 | 5, 6 | Load |
| 17 | 6 | Condensers 17, 17', . . . in Equivalent Circuit |
| 18 | 6 | Leakage Resistors in Equivalent Circuit |
| 19 | 7 | Pillar Molecules between Polymer Chains |
| 20 | 9 | Polycarbon Difluoride Polymer Chain |
| 21 | 9 | Polyethylene Chains |
| 22 | 10 | Short Polycarbon Difluoride Polymer Chain |
| 23 | 11 | Copolymer of Ethylene and Carbon Difluoride |
| 24 | 12 | Electroordered Donor-Link-Acceptor Molecules |
| 25 | 12 | Fluid/Solid Medium |
| 26 | 12 | Dipolar Molecule |
| 27 | 13 | Steps in the Manufacture of a Quensor Device |
| 28 | 13 | Raw materials for casting solution |
| 29 | 13 | Pipe with Solution for First Quensor Film |
| 30 | 13 | Pipe with Solution for Second Quensor Film |
| 31 | 13 | First Quensor Film |
| 32 | 13 | Second Quensor Film |
| 33 | 13, 14 | First Metal Layer on First Quensor Film |
| 34 | 13, 14 | Second Metal Layer on Second Quensor Film |
| 35 | 15 | Edge Strip of First Metal Layer |
| 36 | 15 | Edge Strip of Second Metal Layer |
| 37 | 14, 15 | Insulating edge strip on quensor film 31 |
| 38 | 14, 15 | Insulating edge strip on quensor film 32 |
| 39 | 14, 15, 16 | Quensor Composite Film Assembly |
| 40 | 16, 17 | Casing Assembly |
| 41 | 16, 17 | Base Support |
| 42 | 16, 17 | First End Plate |
| 43 | 16, 17 | Second End Plate |
| 44 | 16, 17 | Quensor Coil |
| 45 | 16, 17 | First Leadin Insulator |
| 46 | 16, 17 | Second Leadin Insulator |
| 47 | 16, 17 | Terminal of First Metal Layer |
| 48 | 16, 17 | Terminal of Second Metal Layer |
| 49 | 18 | Photovoltaic sheet (PV Sheet) |
| 50 | 18 | Positive Terminal on PV Sheet |
| 51 | 18 | Negative Terminal on PV Sheet |
| 52 | 18 | Insulating Sheet |
| 53 | 18 | Quensor Sheet (Q Sheet) |
| 54 | 18 | Positive Terminal on Q Sheet |
| 55 | 18 | Negative Terminal on Q Sheet |
| 56 | 18 | Polarization Direction of Top PV sheet |
| 57 | 18 | Polarization Direction of Bottom PV sheet |
| 58 | 18 | Top Protective Transparent Sheet |
| 59 | 18 | Bottom Protective Sheet |
| 60 | 18 | Inverter-Voltage Converter HV DC/120 volt-60 Hz |
| 61 | 18 | PVQ Sheet |

Other embodiments of the herein described invention may be practiced by those skilled in the art, without departing from the scope of this invention.

What I wish to claim is:

1. In a sheet for electric energy storage or retrieval, first and second surfaces on said sheet, first and second conducting films on said surfaces, an axis normal to said surfaces, a donor, an acceptor, a linker, a gap, a pair, said pair comprising a said donor and a said acceptor chemically bonded to opposite ends of said linker, a plurality of insulating pairs being located head to tail on said axis, a said gap between each adjacent pair, each said gap being about 5 to 30 Å; wherein said plurality of insulating pairs are aligned parallel to the axis normal to said surfaces.

2. In a system for electric energy storage or retrieval, a sheet, first and second conducting films on the surfaces of said sheet, an axis normal to said surfaces, a donor, an acceptor, a linker, a gap, a pair, said pair comprising a said donor and a said acceptor chemically bonded to opposite ends of said linker, a plurality of said pairs being located head to tail on said axis, a said gap between each adjacent pair, each said gap being about 5 to 30 Å, a DC electric energy source, positive and negative terminals on said -source, said negative terminal of said source connected to said first conducting film, said positive terminal of said source connected to said second conducting film, whereby electric energy from said source withdraws an electron from a said donor, thereby positively ionizing said donor, said electron tunneling from said donor across said gap negatively ionizing a said acceptor, internal and external dipole electric fields being established between said positive and negative ions, electric energy from said source being stored in the said electric fields; or, in lieu of said source, a load, said load being connected to said first and second conducting films thereby providing an electric circuit through said load, discharging said ions, said stored electric energy being delivered to said load.

3. In a sheet for electric energy storage or retrieval, first and second surfaces on said sheet, first and second conducting films on said surfaces, an axis normal to said surfaces, a donor, an acceptor, a linker, a gap, a pair, said pair comprising a said donor and a said acceptor chemically bonded to opposite ends of said linker, a plurality of pairs being located head to tail on said axis, a said gap between each adjacent pair, each said gap being about 5 to 30 Å; in which said conducting films are metal films, a composite polymer, said composite polymer comprising a first polymer chain and a second polymer chain, OXYZ axes, said sheet comprising first and second polymer chains, said surfaces on said sheet being parallel to the YOZ plane, said composite polymer film being stretch-oriented parallel to the OZ axis, said first and second metal films being on said surfaces of said sheet, a donor and an acceptor chemically bound to said first polymer chain, said second polymer chain being an insulator, said first and second polymers being in the weight proportion (1−x) and x respectively, where 3<[x/(1−x)]<20, thereby providing a tunneling gap between adjacent donor and acceptors on said polymer chains, enabling an electron to tunnel from a said donor on a polymer chain to a said acceptor on an adjacent polymer chain, a first strip electrode, a second strip electrode, said first strip electrode being connected on one edge of said film to said first conducting film, and said second strip electrode being connected on the other edge to said second conducting film.

4. A sheet for electric energy storage or retrieval according to claim 3 in which said first polymer is polytetrafluoroethylene and said second polymer is polyethylene.

5. A sheet for electric energy storage or retrieval according to claim 3 in which a said donor is a fluorine atom on a first polymer chain, and a said acceptor is a fluorine atom on an adjacent first polymer chain.

6. A sheet for electric energy storage or retrieval according to claim 3 in which the said sheet has a thickness of about 300 to 10000 Å, and the charging or discharging potential difference is a few hundred to a few thousand volts.

7. A device for electric energy storage or retrieval according to claim 3 in which a plurality of said sheets are stacked, and in which said first and second metal films are connected to said first and said second strip electrodes on opposite sides of said sheets parallel to the OZ axis.

8. A device for electric energy storage or retrieval according to claim 7 in which the said sheets are wound on the order of about 50,000 turns in a cylindrical roll.

9. A device for electric energy storage or retrieval according to claim 8, an enclosure, terminals on said enclosure, said cylindrical roll mounted in said enclosure, said first and second strip electrodes connected to said terminals on said enclosure.

10. A sheet for electric energy storage or retrieval according to claim 1 in which the said donor atom is fluorine, and said acceptor atom is fluorine in a close array, the energy storage per unit weight of said sheet being 1–15 kwhrs/kg.

11. A sheet for electric energy storage or retrieval according to claim 1, in which said donors are selected from the class consisting of elements or groups listed in TABLE IV; and, in which said acceptors are selected from the class consisting of elements or groups listed in Table III.

12. A sheet for electric energy storage or retrieval according to claim 3, in which the said first and second polymers are combined chemically as their monomers into a copolymer chain, the weight ratio of said second monomer to said first monomer being from 3 to 20, whereby the mean free path of an electron between a said donor and a said acceptor on an adjacent polymer chain is between 5 Å and 20 Å.

13. A sheet for electric energy storage or retrieval according to claim 3, in which said first polymer chain is short and in which said second polymer chain is long, said first polymer chain being intermixed and aligned in a matrix of said second polymer chains, whereby the mean free path of an electron tunnelling across a gap between a donor and an acceptor on adjacent polymer chains is about 5 Å to 30 Å.

14. A sheet for electric energy storage or retrieval according to claim 3, in which only said first polymer chains are present, rigid cross-linked pillar groups orthogonal to and separating adjacent polymer chains a distance of 5 to 30 Å, the space between said polymer chains being otherwise empty.

15. In a sheet for electric energy storage or retrieval according to claim 1, a linear structure, said structure comprising a said donor-and a said acceptor chemically bound to opposite ends of said linker, a fluid medium, said fluid medium being capable of solidification, said structures being dissolved or suspended in said fluid, a layer of said fluid containing said structures between said conducting films; a first means to apply an electric field to align and electroorder said structures parallel to said axis, and a second means to solidify said fluid and retain the alignment of said structure.

16. In a device according to claim 7, a DC-AC inverter, a load, said device being connected to said inverter and said load, whereby said high voltage DC electric power output is converted to low voltage AC electric power and supplied to said load.

17. In a composite sheet for the storage or retrieval of solar electric energy, a photovoltaic (PV) sheet and a quensor (Q) sheet, the said photovoltaic (PV) sheet for the conversion of solar energy to electric energy, and the said quensor (Q) sheet for the storage or retrieval of electric energy according to claim 1, said PV and said Q sheet being secured together as a composite PVQ sheet, first and second electric terminals on said PV and Q sheets, a load, said load being connected electrically to said PV and Q sheets, whereby solar–electric energy is provided to said load on demand day or night.

* * * * *